United States Patent [19]
Saito et al.

[11] Patent Number: 5,382,477
[45] Date of Patent: Jan. 17, 1995

[54] ORGANIC ELECTROLUMINESCENT ELEMENT AND PROCESS FOR PRODUCING THE SAME

[75] Inventors: Shogo Saito; Tetsuo Tsutsui, both of Fukuoka; Chihaya Adachi, Tokyo; Yuji Hamada, Osaka, all of Japan

[73] Assignee: Sanyo Electric Co., Ltd., Osaka, Japan

[21] Appl. No.: 840,174

[22] Filed: Feb. 24, 1992

[30] Foreign Application Priority Data

Feb. 27, 1991 [JP] Japan ................................. 3-032905
Feb. 27, 1991 [JP] Japan ................................. 3-032906
Sep. 3, 1991 [JP] Japan ................................. 3-222793
Sep. 3, 1991 [JP] Japan ................................. 3-222794
Nov. 27, 1991 [JP] Japan ................................. 3-312380

[51] Int. Cl.$^6$ .......................................... H05B 33/14
[52] U.S. Cl. .................................. 428/690; 428/917; 313/503; 313/504; 313/506
[58] Field of Search ................... 428/690, 691, 917; 313/504, 503, 506

[56] References Cited

U.S. PATENT DOCUMENTS

| | | | |
|---|---|---|---|
| 3,189,447 | 6/1965 | Neugebauer | 96/1 |
| 5,085,946 | 2/1992 | Saito et al. | 428/690 |
| 5,085,947 | 2/1992 | Saito et al. | 428/690 |
| 5,093,210 | 3/1992 | Ohta et al. | 428/690 |

*Primary Examiner*—Charles R. Nold
*Attorney, Agent, or Firm*—Wegner, Cantor, Mueller and Player

[57] ABSTRACT

There is disclosed an EL element having at least one layer made from organic materials between an electron injection electrode and a hole injection electrode, the organic materials consisting of oxadiazole series compounds which have a plurality of oxadiazole rings.

68 Claims, 3 Drawing Sheets

ORGANIC ELECTROLUMINESCENT ELEMENT AND PROCESS FOR PRODUCING THE SAME

BACKGROUND OF THE INVENTION

1. Field of the Invention

This invention relates to an organic electroluminescent element and especially to such an element having improved film-forming properties and a production process thereof.

2. Related Arts

Recently, in accordance with diversification of information apparatuses, the demand has been growing for flat-type display elements which consume less electric power and need smaller space than cathode-ray tubes (CRT). There are a crystalline liquid device, a plasma display device and the like as such a flat-type display device. Now, an electroluminescent (hereinafter referred to as EL) element which is a self-luminescent type and provides clear display has been drawing special attention.

Here, the EL elements can be divided between inorganic EL elements and organic EL elements depending on the constituent materials, the former having already been put to practical use.

However, the inorganic EL element needs to be driven with high voltage because its driving type is so called 'Collisional excitation type' wherein accelerated electrons impressed in a high electrical field make the luminescence center luminesce through collisional excitation. This leads to an increase in the cost of surrounding devices. On the other hand, the organic EL element can be driven with low voltage because it is a charge (hole and electron) injected from an electrode. It has another advantage of being able to gain any luminous colors easily by modifying molecular structure of the organic compounds. Therefore, the organic EL element is very promising as a new display element.

The organic EL element is generally formed with either a two-layer structure or a three-layer structure. The two-layer structure has either a SH-A structure wherein a hole transport layer and a luminous layer are formed between a hole injection electrode and an electron injection electrode, or a SH-B structure wherein a luminous layer and an electron transport layer are formed between a hole injection electrode and an electron injection electrode. The three-layer structure has a DH structure wherein a hole transport layer, a luminous layer and an electron transport layer are formed between a hole injection electrode and an electron injection electrode. Electrode materials having a large work function such as gold and ITO (In—Sn oxide) are used as the above hole injection electrodes, while electrode materials having a small work function such as Mg are used as the above electron injection electrodes. Organic materials are used for the above hole transport layers, luminous layers and electron transport layers. Materials having P-type semi-conductor characteristics are used for the hole transport layers, and those having N-type semi-conductor characteristics are used for the electron transport layers. Materials having N-type semi-conductor characteristics are used in the SH-A structure, those having P-type semi-conductor characteristics are used in the SH-B structure and those having characteristics close to neutral are used in the DH structure for the above luminous layers. Every structure described above is based on a common principle that holes injected from a hole injection electrode and electrons injected from an electron injection electrode recombine on the boundary surface of a luminous layer and a hole (or electron) transport layer, causing the inside of the luminous layer to luminesce.

The choice of materials in the above organic element greatly affects its various characteristics such as luminous efficiency and durability.

For example, 1,1,4,4,-tetraphenyl-1, 3-butadiene derivatives and styrylbenzene derivatives are proposed as blue luminescent materials in a luminous layer, but their film-forming properties are too poor to gain sufficient luminance and stability.

Also, tBu-PBD [2-(4'-tert-Butylphenyl)-5-(4''-biphenyl)-1,3,4-oxadiazole], perylene derivatives and the like are known as electron transport materials. The former makes the durability of EL elements deteriorate because of its poor film-forming properties, while the latter has a restricted use as an electron transport layer because its fluorescent wavelength is around 600–800 nm. This means that when the fluorescent wavelength of an electron transport layer is longer than that of a luminous layer, excitons formed in the luminous layer move to the electron transport layer to disappear.

Also, several kinds are known as hole transport materials and typical among them are a compound with an oxadiazole ring inside the molecular structure, and a diamine derivative. These compounds have excellent hole transport characteristics and have been used as organic EL materials but they have a problem of being destroyed after film-forming due to their being easily crystallized.

SUMMARY OF THE INVENTION

Therefore, the main object of the present invention is to provide a useful EL element which has durability and retains stable luminance for a long period of time.

Another object of the present invention is to provide an organic material which has good film-forming properties as a material for an EL element.

Another object of the present invention is to provide an organic luminescent material which has high luminance for blue luminescence in addition to good film-forming properties.

The above objects are achieved by an EL element having at least one layer made from organic materials between an electron injection electrode and a hole injection electrode, the organic materials including oxadiazole series compounds which have a plurality of oxadiazole rings.

The layers made from organic materials may consist of two layers of an organic luminous layer and an electron transport layer, the electron transport layer being provided between the organic luminous layer and the electron injection electrode.

The organic luminous layer may include the oxadiazole series compounds, and the electron transport layer includes organic compounds which have a larger excitonic energy than that of the oxadiazole compounds used in the organic luminous layer.

The oxadiazole series compounds may have one benzene ring between the oxadiazole rings.

The oxadiazole series compounds may have two benzene rings between the oxadiazole rings.

The oxadiazole series compounds may have an alkyl chain between the oxadiazole rings.

The number of said oxadiazole rings may be 2, the benzene ring being substituted by the oxadiazole rings at one of the ortho position (1,2), meta position (1,3) and para position (1,4).

The benzene ring, which is substituted by the oxadiazole rings at the two positions, may be substituted by the oxadiazole ring at one more position.

The number of the oxadiazole rings may be 3, the benzene ring being substituted by the oxadiazole rings at the 1, 3 and 5 positions.

The number of said oxadiazole rings may be 2, the a biphenyl group which consists of the two benzene rings being substituted by the oxadiazole at either the 4- and 4'- or 2- and 2'- positions.

The number of said oxadiazole rings may be 2, the carbon number of an alkyl chain between the rings being 1–6.

The oxadiazole series compounds may be selected from the group consisting of the chemical formulas shown below.

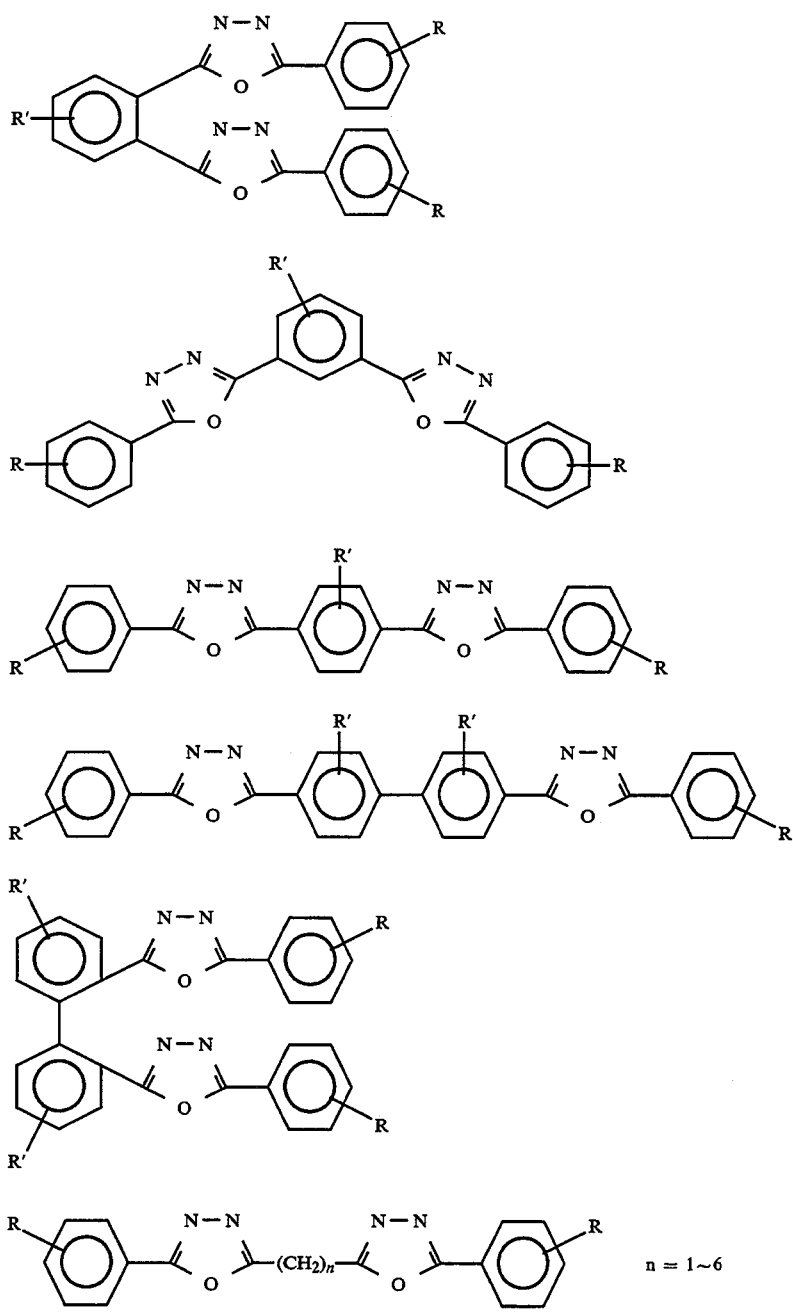

-continued
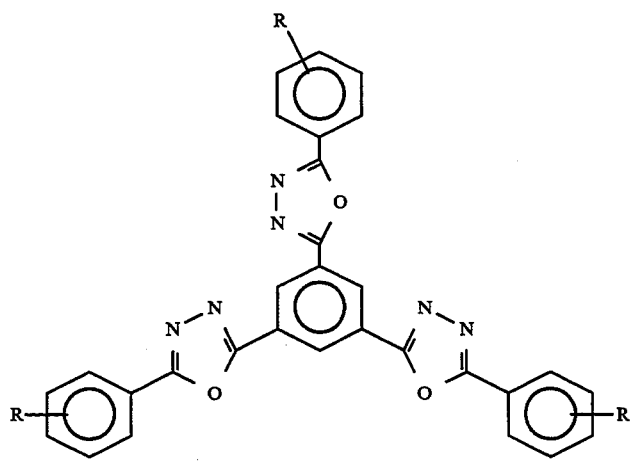
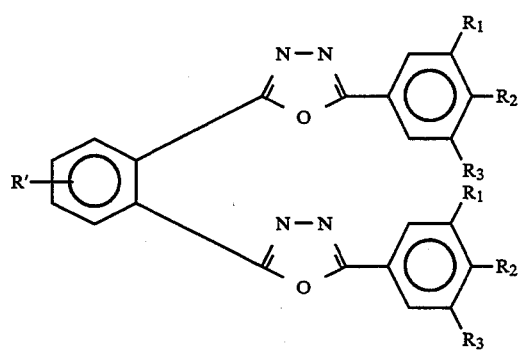
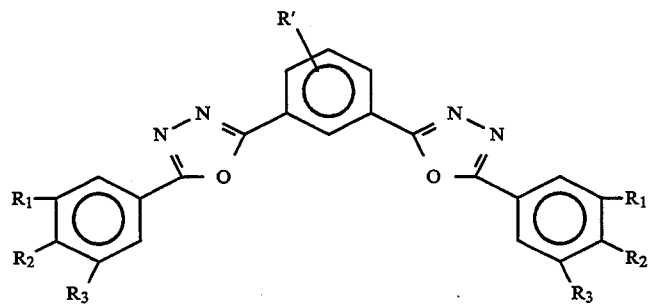
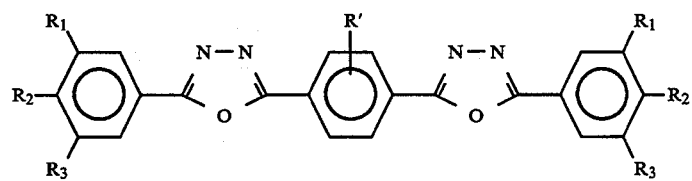
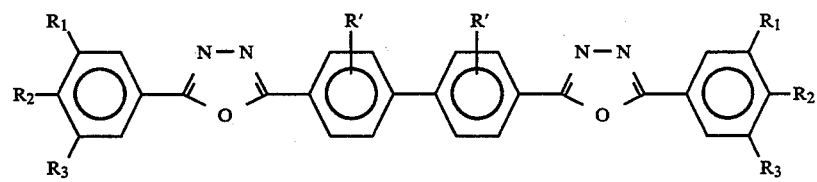

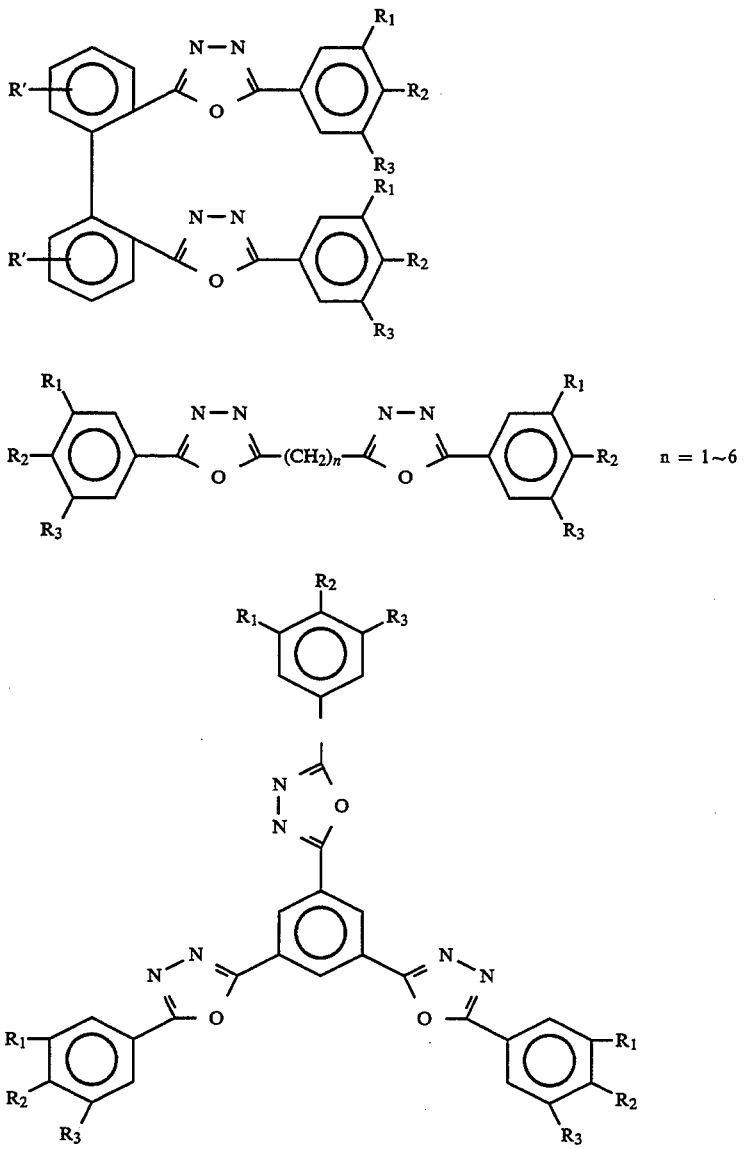

The above R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl.

The above R' is selected from the group consisting of H, $CH_3$, $C_2H_5$, $OCH_3$, $OC_2H_5$, $N(CH_3)_2$ and an oxadiazole ring.

The electron transport layer may include the oxadiazole series compounds, and the organic luminous layer includes organic compounds which have a lower excitonic energy than that of the oxadiazole series compounds used in the electron transport layer.

The oxadiazole series compounds may have one benzene ring between the oxadiazole rings.

The oxadiazole series compounds may have two benzene rings between the oxadiazole rings.

The oxadiazole series compounds may have an alkyl chain between the oxadiazole rings.

The number of said oxadiazole rings may be 2, the benzene ring being substituted by the oxadiazole rings at one of the ortho position (1,2), meta position (1,3) and para position (1,4).

The benzene ring, which is substituted by the oxadiazole rings at the two positions, may be substituted by the oxadiazole ring at one more position.

The number of the oxadiazole rings may be 3, the benzene ring being substituted by the oxadiazole rings at the 1, 3 and 5 positions.

The number of the oxadiazole rings may be 2, a biphenyl group which consists of the two benzene rings being substituted by the oxadiazole at either the 4- and 4'- or 2- and 2'- positions.

The number of the oxadiazole rings may be 2, the carbon number of an alkyl chain between the ring being 1–6.

The oxadiazole series compounds may be selected from the group consisting of the chemical formulas shown below.

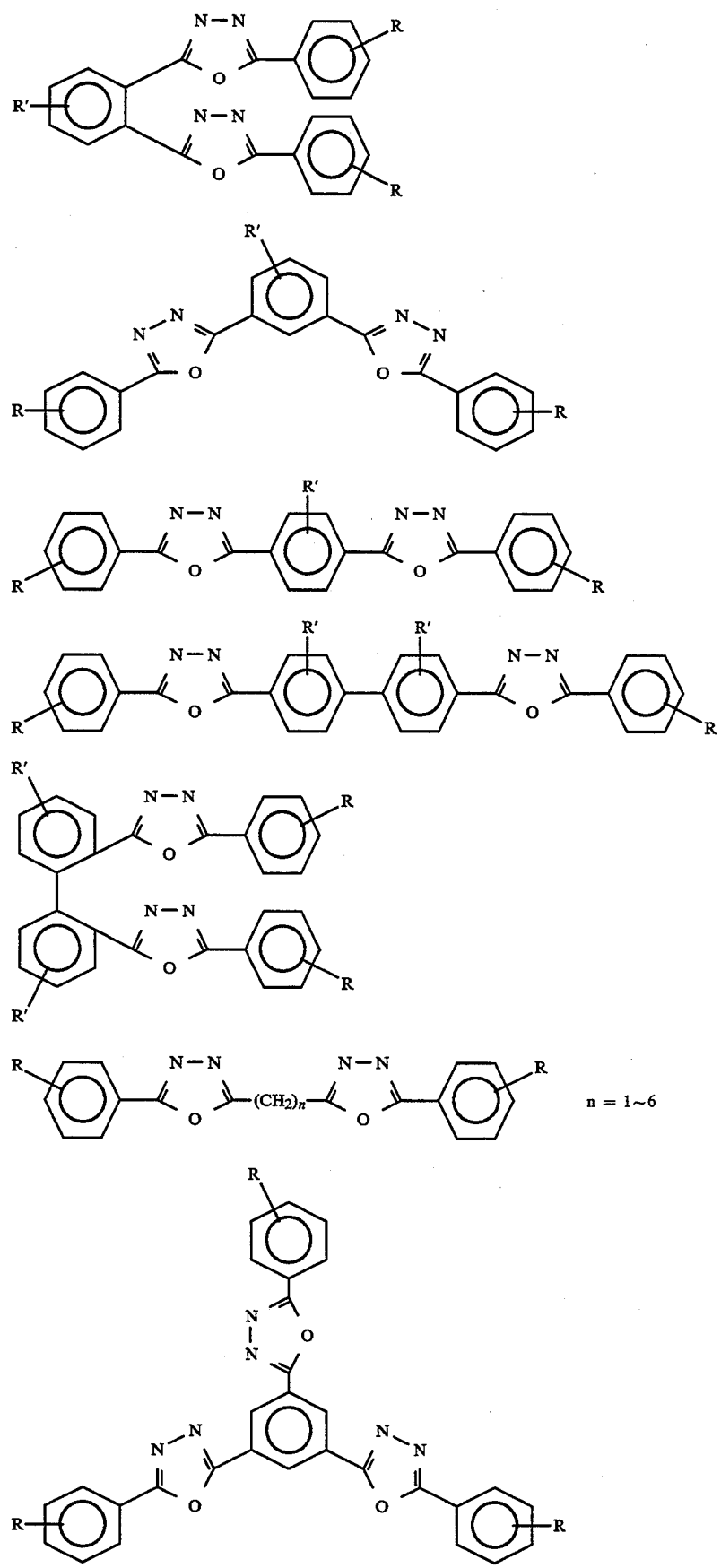

-continued
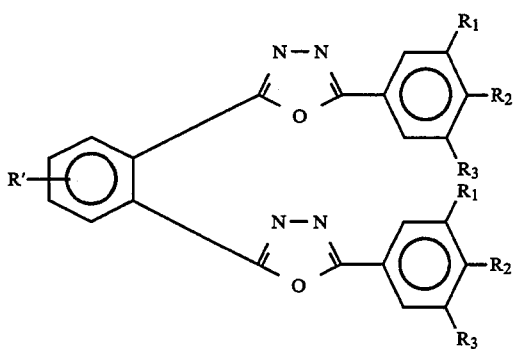
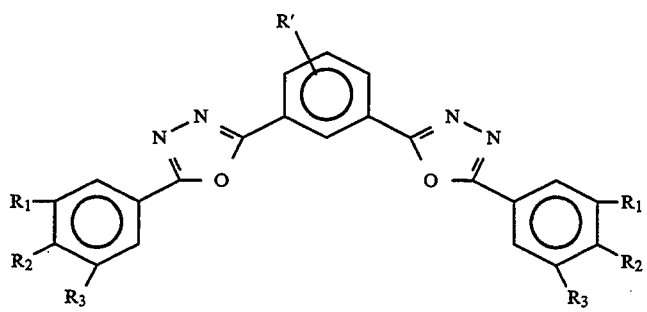
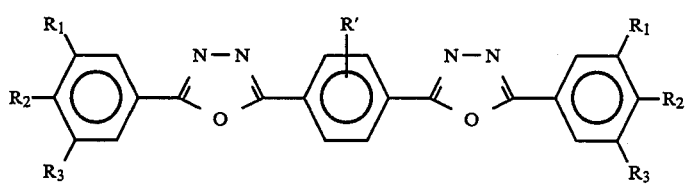
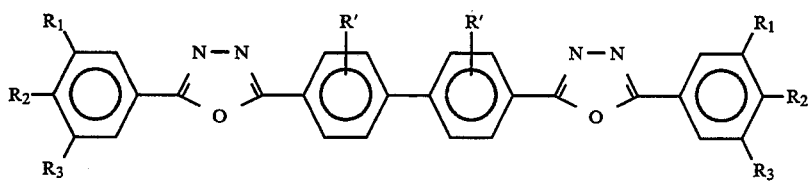
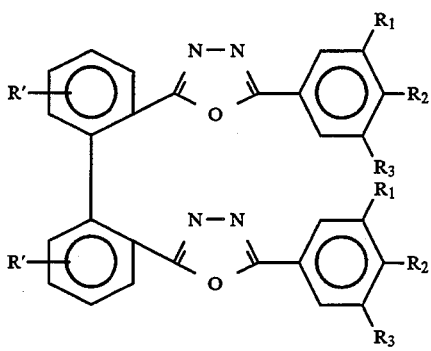
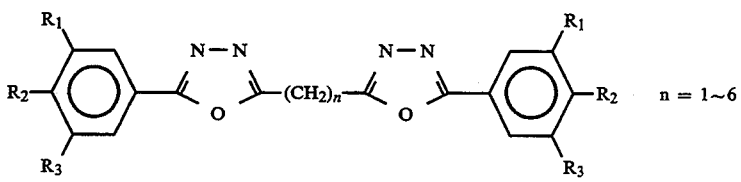
n = 1~6

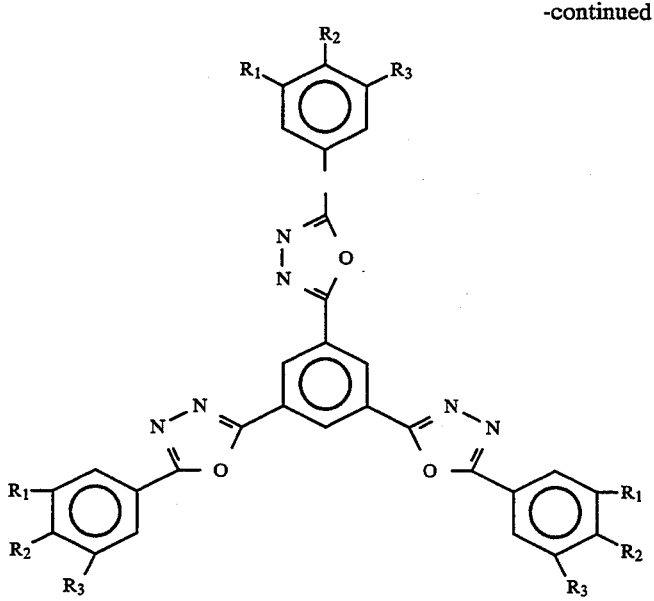

The above R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl.

The above R' is selected from the group consisting of H, $CH_3$, $C_2H_5$, $OCH_3$, $OC_2H_5$, $N(CH_3)_2$ and an oxadiazole ring.

The organic compound which forms the organic luminous layer may be a triphenyl-amine derivative.

The layers made from organic materials may include 2 layers of an organic luminous layer and a hole transport layer, the hole transport layer being provided between the organic luminous layer and the hole injection electrode.

The organic luminous layers may include the oxadiazole series compounds, the hole transport layer including organic compounds which have a larger excitonic energy than that of the oxadiazole compounds used in the organic luminous layer.

The oxadiazole series compounds may have one benzene ring between the oxadiazole rings.

The oxadiazole series compounds may have two benzene rings between the oxadiazole rings.

The oxadiazole series compounds may have an alkyl chain between the oxadiazole rings.

The number of said oxadiazole rings may be 2, the benzene ring being substituted by the oxadiazole rings at one of the ortho position (1,2), meta position (1,3) and para position (1,4).

The benzene ring, which is substituted by the oxadiazole rings at the two positions, may be substituted by the oxadiazole ring at one more position.

The number of the oxadiazole rings may be 3, the benzene ring being substituted by the oxadiazole rings at the 1, 3 and 5 positions.

The number of the oxadiazole rings may be 2, a biphenyl group which consists of the two benzene rings being substituted by the oxadiazole at either the 4- and 4'- or 2- and 2'- positions.

The number of the oxadiazole rings may be 2, the carbon number of an alkyl chain between the rings being 1-6.

The oxadiazole series compounds may be selected from the chemical formulas shown below.

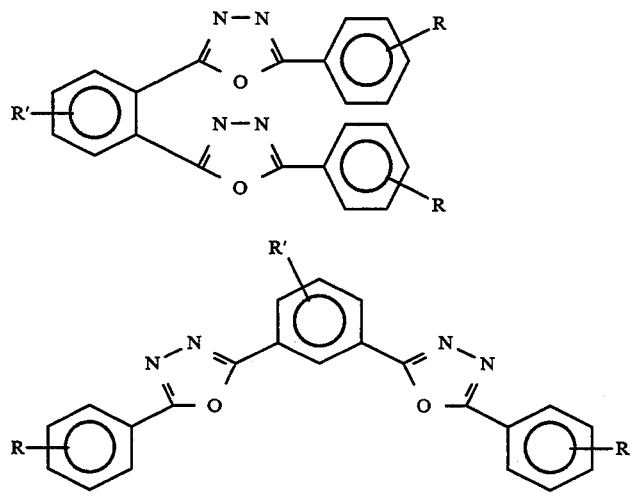

-continued
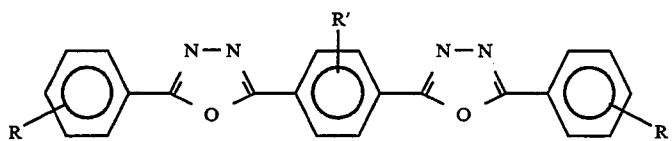
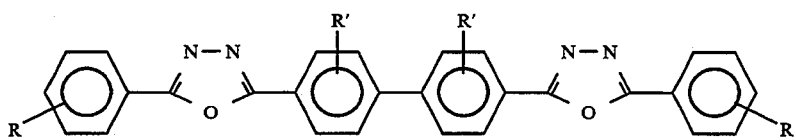
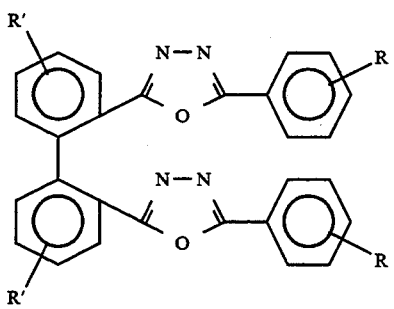
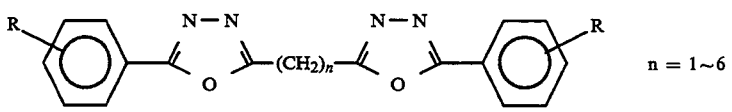   n = 1~6
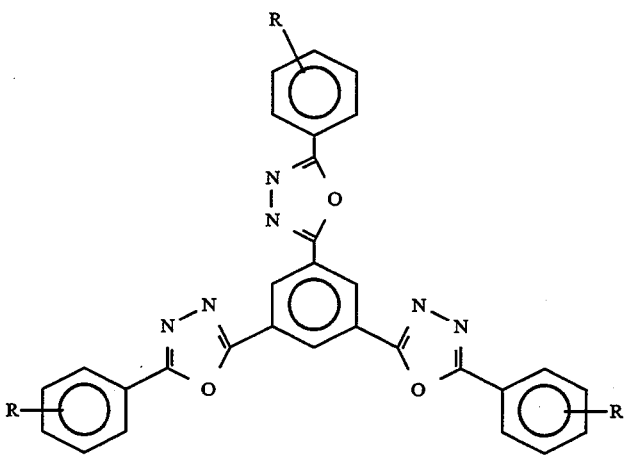
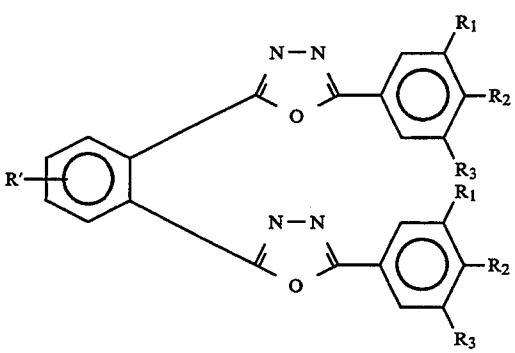

-continued
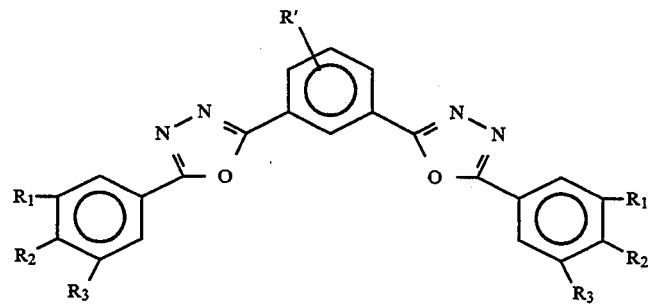
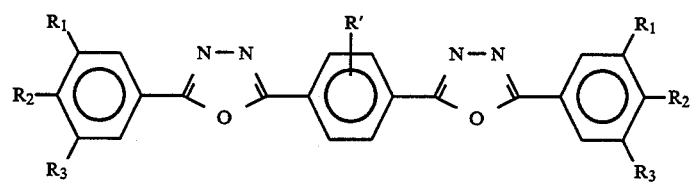
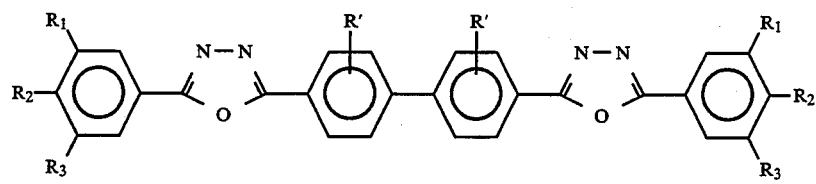
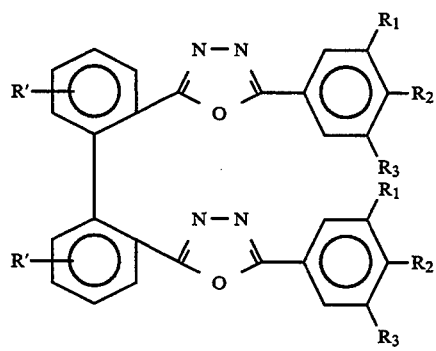
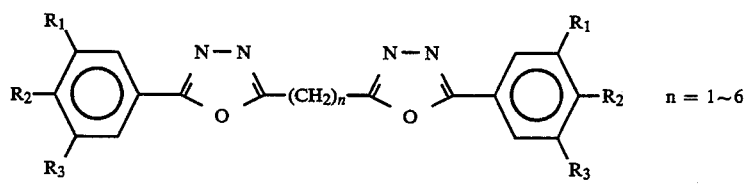 n = 1~6
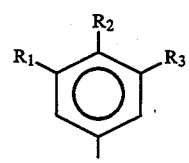

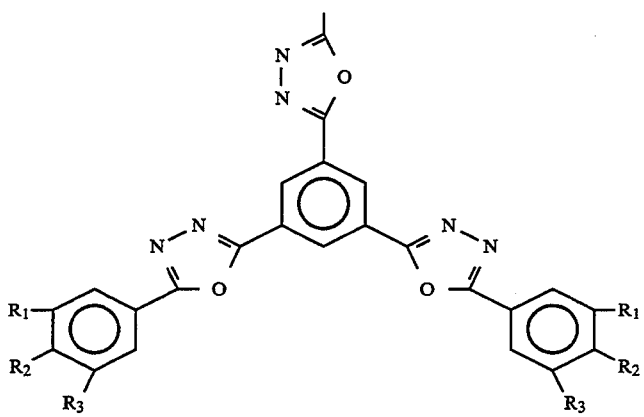

The above R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl.

The above R' is selected from the group consisting of H, $CH_3$, $C_2H_5$, $OCH_3$, $OC_2H_5$, $N(CH_3)_2$ and an oxadiazole ring.

The organic compounds which form a hole transport layer may be diamine.

A hole transport layer may include the oxadiazole series compound, an organic luminous layer including the organic compounds having a lower excitonic energy than that of oxadiazole compounds used in the hole transport layer.

The oxadiazole series compounds may have one benzene ring between the oxadiazole rings.

The oxadiazole series compounds may have two benzene rings between oxadiazole rings.

The oxadiazole series compounds may have an alkyl chain between the oxadiazole rings.

The number of said oxadiazole rings may be 2, the benzene ring being substituted by the oxadiazole rings at one of the ortho position (1,2), meta position (1,3) and para position (1,4).

The benzene ring, which is substituted by the oxadiazole rings at the two positions, may be substituted by the oxadiazole ring at one more position.

The number of the oxadiazole rings may be 3, the benzene ring being substituted by the oxadiazole rings at the 1, 3 and 5 positions.

The number of the oxadiazole rings may be 2, a biphenyl group which consists of the two benzene rings being substituted by the oxadiazole at either the 4- and 4'- or 2- and 2'- positions.

The number of the oxadiazole rings may be 2, the carbon number of an alkyl chain between the rings being 0–10.

The oxadiazole series compounds may be selected from the group consisting of the chemical formulas shown below.

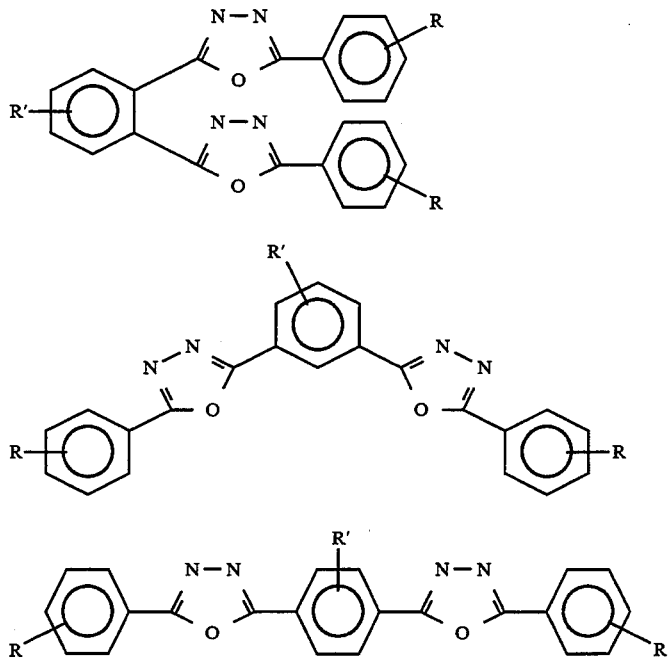

-continued
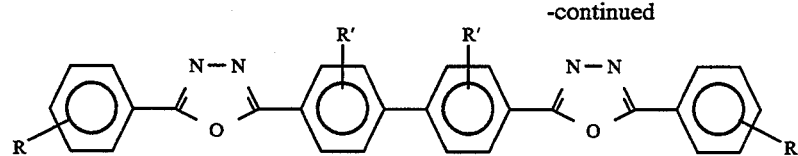
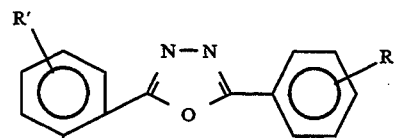
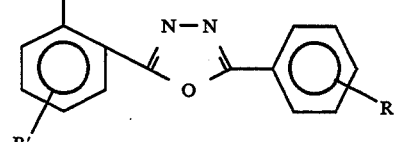
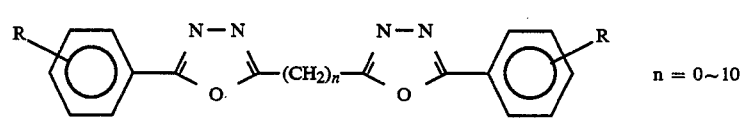   n = 0~10
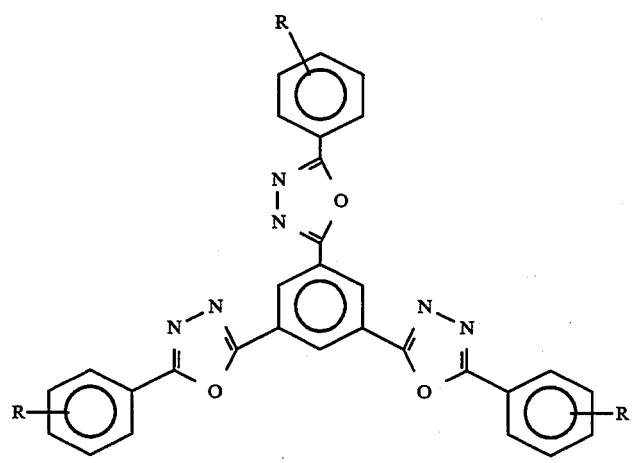
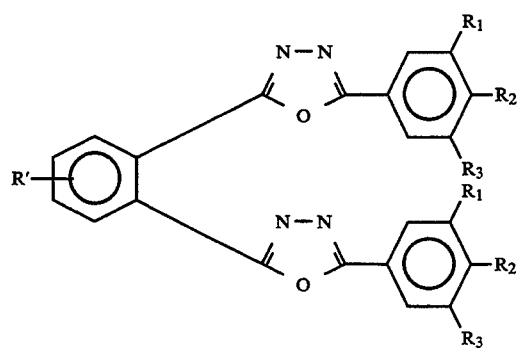
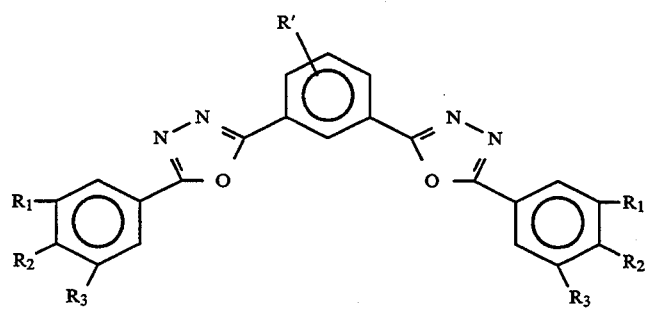

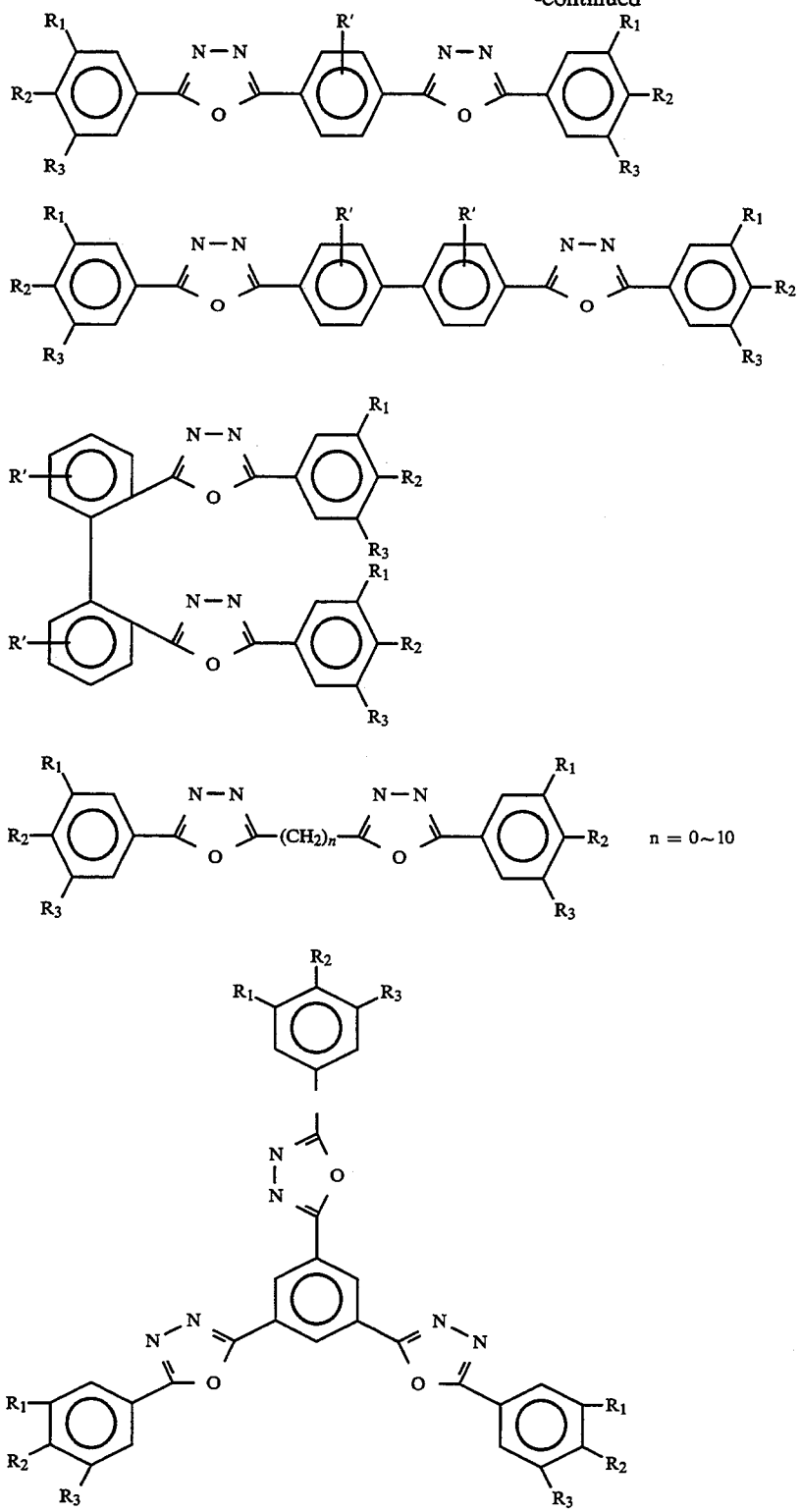

The above R, R1, R2 and R3 are selected from the group consisting of $NH_2$, $N(CH_3)_2$, and $N(C_2H_5)_2$.

The above R' is selected from the group consisting of H, $C_nH_{2n+1}(n=1-10)$, $OCH_3$, $OC_2H_5$, phenyl, cyclohexyl and an oxadiazole ring.

The organic compounds which form an organic luminous layer may be selected from the group consisting of 8-Hydroxyquinoline aluminum, a perylene derivative and a perinone derivative.

The layers made from organic materials may include 3 layers of an organic luminous layer, an electron transport layer and a hole transport layer, the electron transport layer being provided between the organic luminous layer and the electron injection electrode, and the hole transport layer being provided between the organic luminous layer and the hole injection electrode.

The organic luminous layers may include the oxadiazole series compounds, the electron transport layer and the hole transport layer including organic compounds having a larger excitonic energy than that of oxadiazole compounds used in the organic luminous layer.

The oxadiazole series compounds may have one benzene ring between the oxadiazole rings.

The oxadiazole series compounds may have two benzene rings between the oxadiazole rings.

The oxadiazole series compounds may have an alkyl chain between the oxadiazole rings.

The number of said oxadiazole rings may be 2, the benzene ring being substituted by the oxadiazole rings at one of the ortho position (1,2), meta position (1,3) and para position (1,4).

The benzene ring, which is substituted by the oxadiazole rings at the two positions, may be substituted by the oxadiazole ring at one more position.

The number of the oxadiazole rings may be 3, the benzene ring being substituted by the oxadiazole rings at the 1, 3 and 5 positions.

The number of the oxadiazole rings may be 2, a biphenyl group which consists of the two benzene rings being substituted by the oxadiazole at either the 4- and 4'- or 2- and 2'- positions.

The number of the oxadiazole rings may be 2, the carbon number of the alkyl chain being 1–6.

The oxadiazole series compounds may be selected from the group consisting of the chemical formulas shown below.

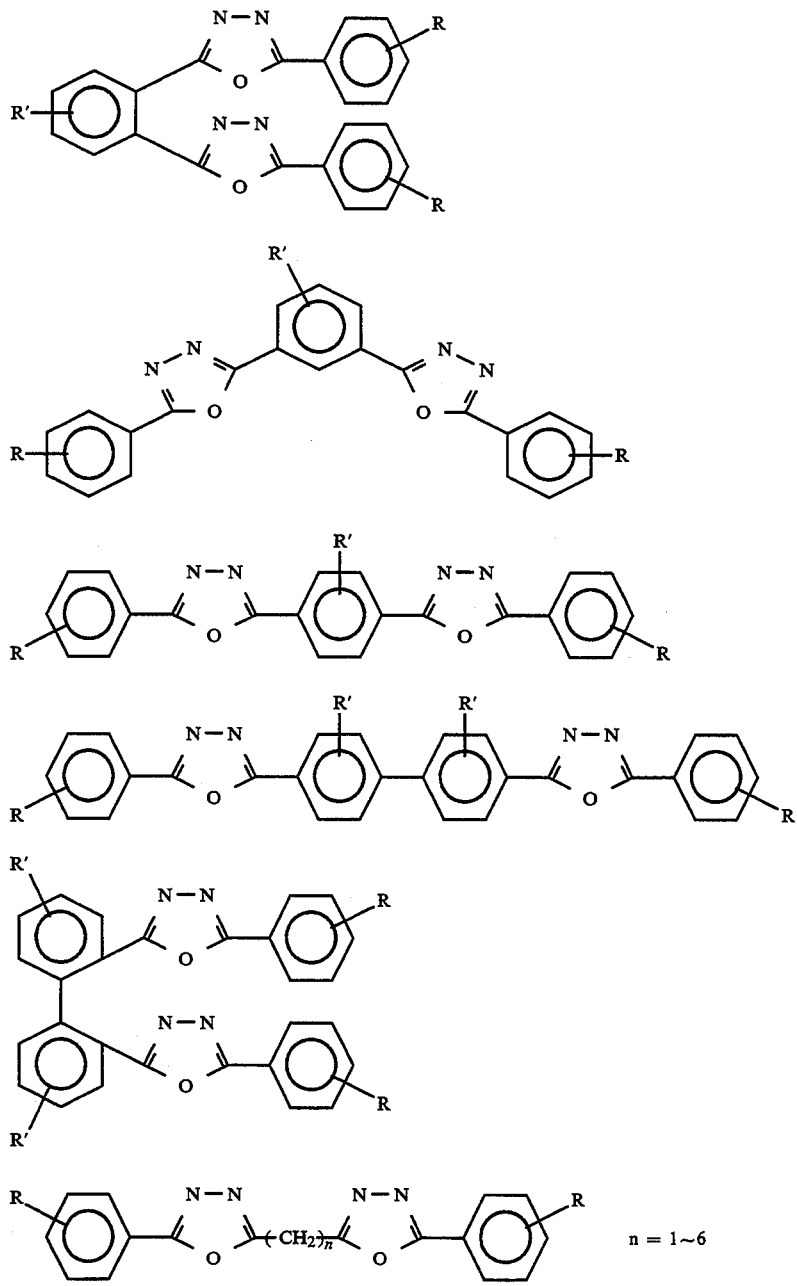

-continued
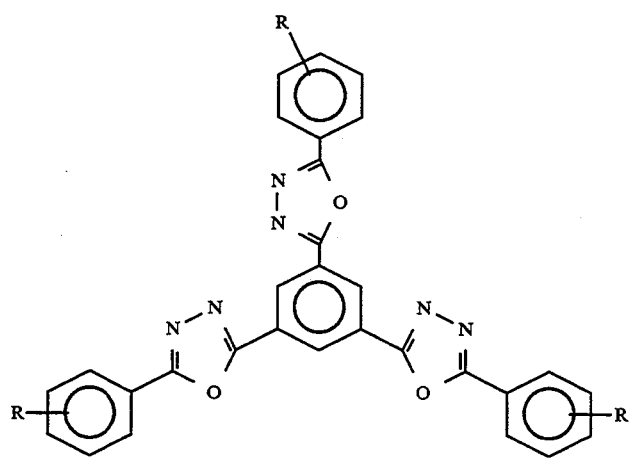
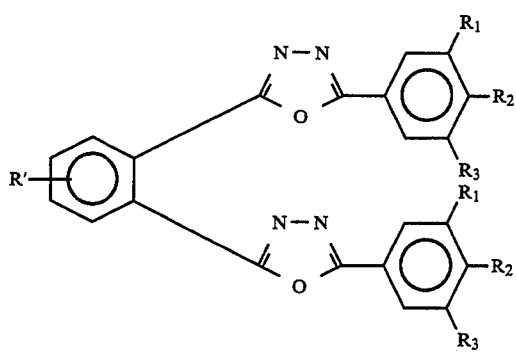
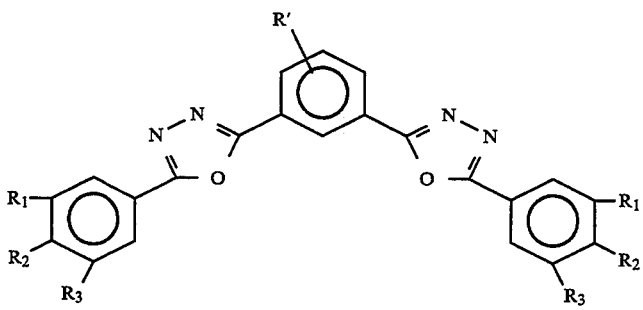
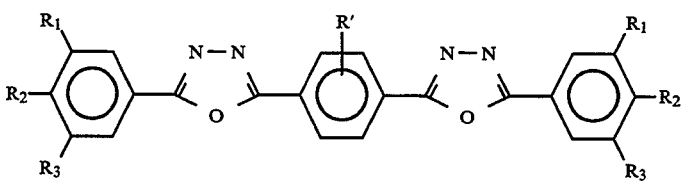
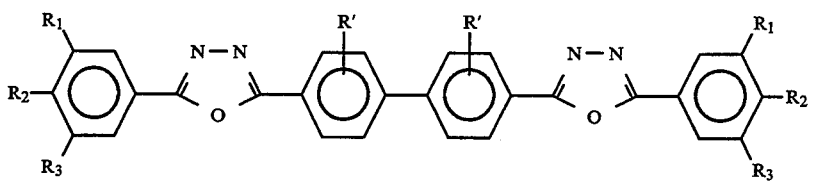

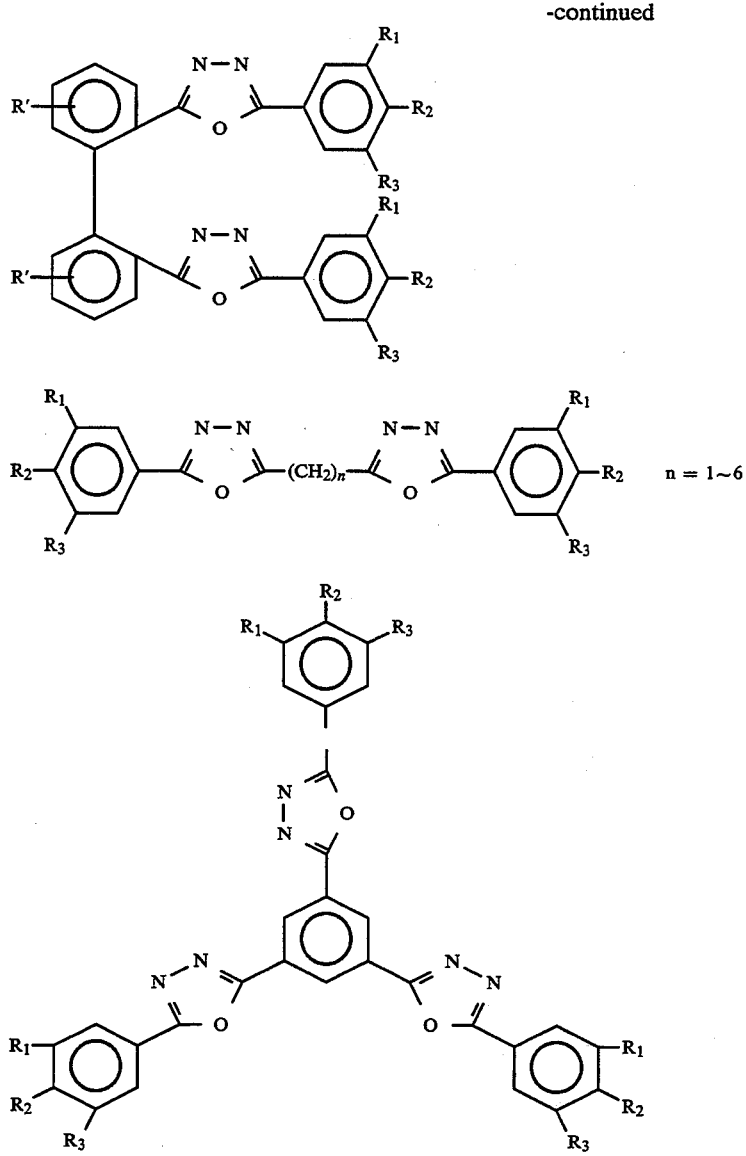

The above R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl.

The above R' is selected from the group consisting of H, $CH_3$, $C_2H_5$, $OCH_3$, $OC_2H_5$, $N(CH_3)_2$ and an oxadiazole ring.

The electron transport layer may include the oxadiazole series compounds. The organic luminous layer may include the organic compounds having less exciton energy than that of the oxadiazole series compounds used in the electron transport layer, the hole transport layer being the organic compounds having a larger excitonic energy than that of the organic compound used in the organic luminous layer.

The oxadiazole series compounds may have one benzene ring between the oxadiazole rings.

It was confirmed through experiments that the oxadiazole series compounds having plural oxadiazole rings have excellent film-forming properties and are not crystallized even after having been stored for a long period of time, which lead to high luminance. Therefore, the EL element using the oxadiazole series compounds as an organic luminous layer has durability and retains stable high luminance. Also, the above-mentioned characteristics of the compounds make it possible to obtain blue luminescence having its peak in the range of 450–534 nm, which has been very hard to obtain.

In addition to its durability, an EL element using the oxadiazole series compounds as an organic electron transport layer and/or a hole transport layer can realize high luminance because it can enclose the excitons inside the luminous layer without a problem that excited energy moves from the luminous layer to the electron transport layer or the hole transport layer, even when all the fluorescent materials of blue through red are used as the luminous layer, because of the large exciton energy of the oxadiazole series compounds.

BRIEF DESCRIPTION OF THE DRAWINGS

These and other objects advantages and features of the invention will become apparent from the following description thereof taken in conjunction on with the accompanying drawings which illustrate a specific embodiment of the invention. In the drawings.

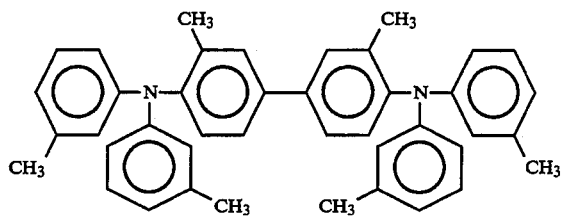

[chemical formula 1]

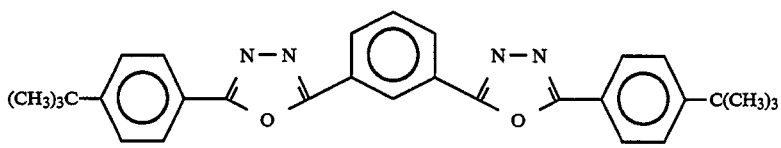

[chemical formula 2]

embodiment of the present invention.

Figure 2:
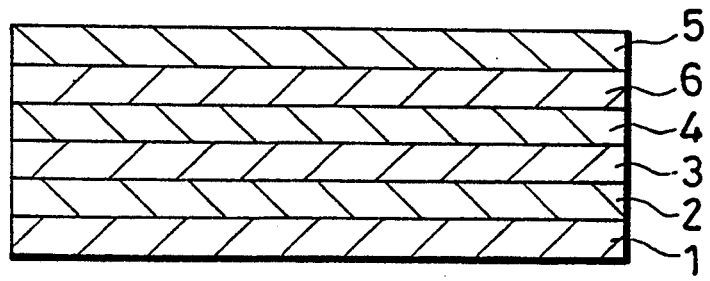

FIG. 2 is a sectional view of an organic EL element having organic three-layer structure (DH structure) according to the third embodiment of the present invention.

Figure 3:
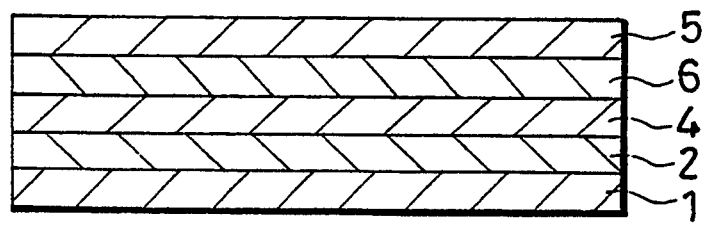

FIG. 3 is a sectional view of an organic EL element having SH-B structure according to the forth embodiment of the present invention.

Figure 4:
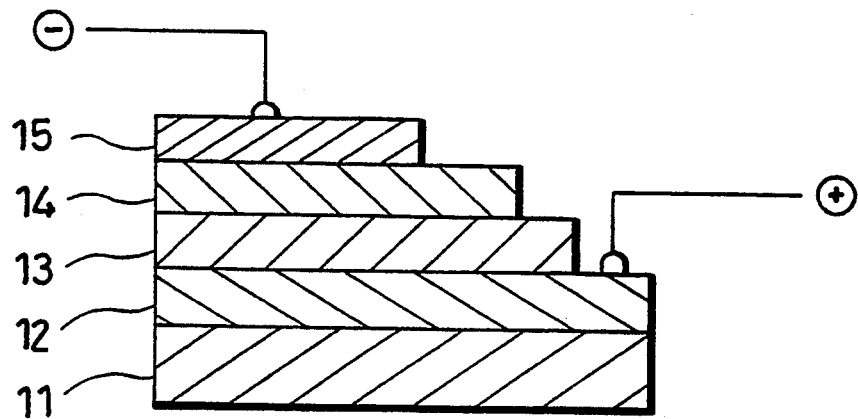

FIG. 4 is a sectional view of an organic EL element according to the embodiments of the present invention.

Figure 5:
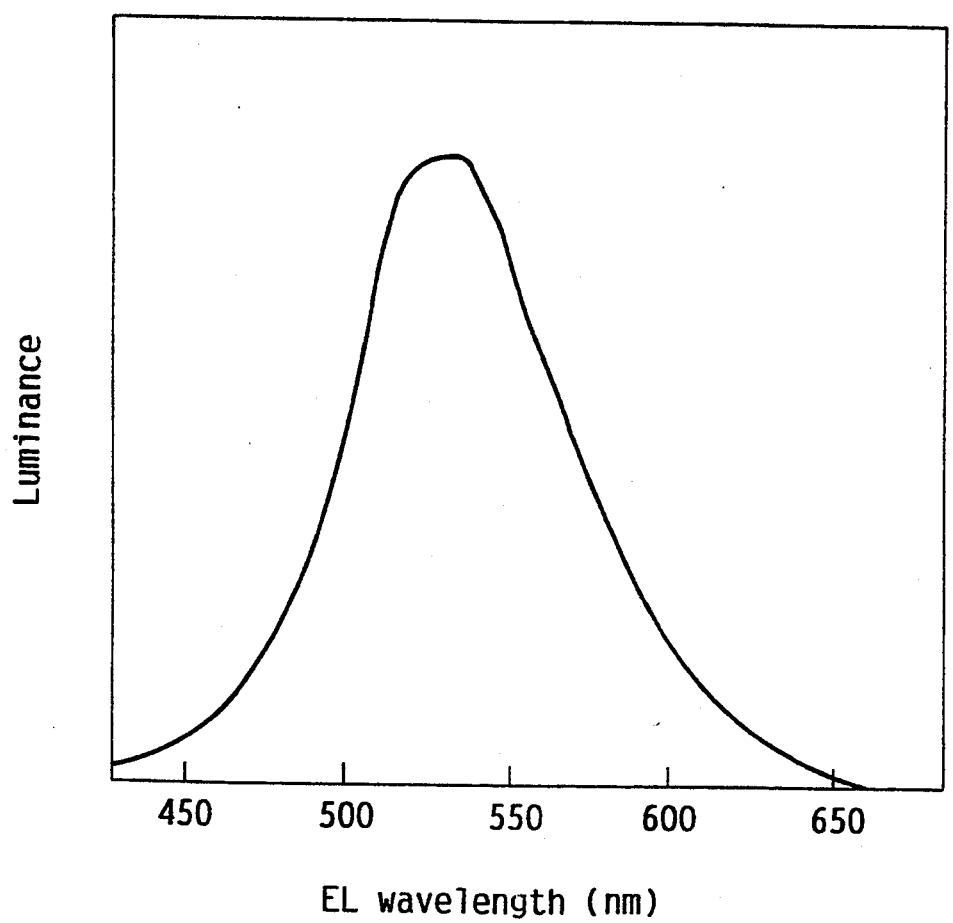

FIG. 5 is a spectral characteristics of an element in the first embodiment according to the present invention.

Figure 6:
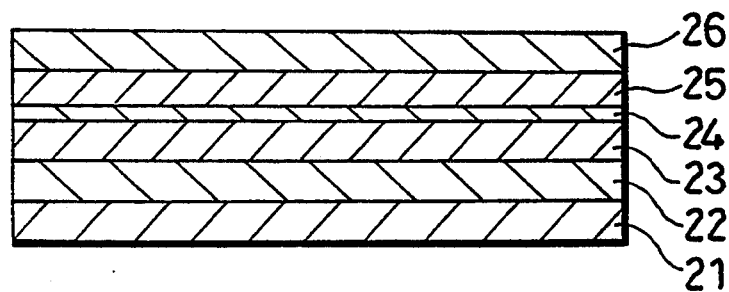

FIG. 6 is a sectional view of an organic EL element in the ninth embodiment according to the present invention.

Figure 7:
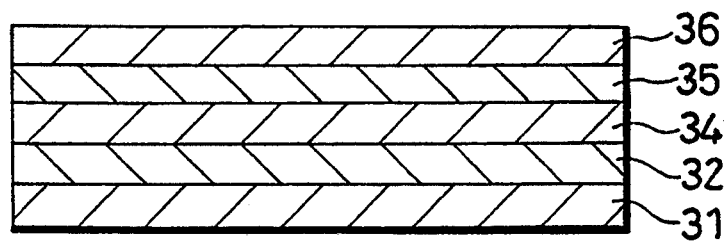

FIG. 7 is a sectional view of an organic EL element in the tenth embodiment according to the present invention.

PREFERRED EMBODIMENTS

The First Embodiment

Figure 1:
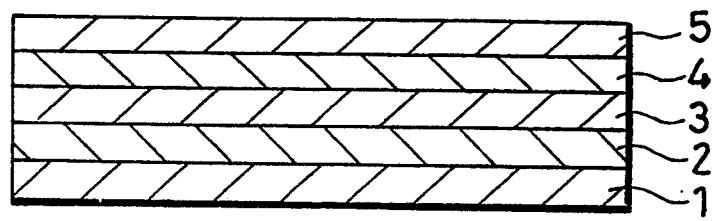
FIG. 1 is a sectional view of an organic EL element having SH-A type of structure according to the first trode 5 formed by mixing Mg and Ag together at the ratio of 10:1, has a thickness of about 2000 Å.

FIG. 1 shows a sectional view of an EL element. A hole injection electrode 2 (positive electrode) is formed on a glass substrate 1, an organic hole transport layer 3 is formed thereon, an organic luminous layer 4 is further provided thereon and finally an electron injection electrode 5 (negative electrode) is formed thereon.

The hole injection electrode 2 comprises, for example, an oxide of In and Sn (ITO), and is formed on the glass substrate 1 by vacuum evaporation.

The hole transport layer 3 which is formed on the above ITO and is made of the diamine derivative expressed by the chemical formula 1 below, has a thickness of about 600 Å. The organic luminous layer 4 made of the oxadiazole derivative expressed by the chemical formula 2 below on the above hole transport layer 3, has a thickness of about 400 Å. An electron injection elec- The EL element with above construction is formed as follows.

First, a glass substrate 1 having a hole injection electrode 2 made of In—Sn oxides (ITO) thereon was cleaned with neutral detergent and ultrasonically cleaned in acetone for 20 minutes and in ethanol for about 20 minutes. Next, the substrate was put in boiling ethanol for about 1 minute, then removed, and immediately dried by hot air. Then, an organic hole transport layer 3 was formed by vacuum evaporating diamine on the hole injection electrode 2, and an organic luminous layer 4 was formed by vacuum evaporating an oxadiazole derivative on the organic hole transport layer 3. Then an organic EL element having a SH-A structure was formed by forming an electron injection electrode 5 by vacuum evaporating Mg and Ag at the ratio of 10:1 on the organic luminous layer 4. The above evaporations were all conducted under the conditions of $1 \times 10^{-6}$ Torr of vacuum, 20° C. for the substrate temperature and 2 Å/sec as the evaporating speed for the organic layers.

The above oxadiazole was formed through a process of the synthesis of an oxadiazole precursor.

1. The synthesis of an oxadiazole precursor.

First, 12.37 g (63.7 mmol) of Isophthalic Dihydrazide and then 100 ml of dehydrated pyridine are put into a three neck flask (capacity: 500 ml). Next, a cooling tube is attached to the mouth of the flask and $N_2$ gas is introduced inside. The pyridine is refluxed using the $N_2$ atmosphere. Under these conditions, 24.37 g (125.7 mmol) of 4-tert-Butylbenzoyl chloride is dropped from a dropping funnel for thirty minutes. The refluxing is carried out continuously for ten hours after the dropping is done. After the reaction is done, the pyridine is removed from the reaction system. The reactant is washed well and is vacuum dried in a vacuum desiccator. Consequently an oxadiazole precursor is formed. The above reaction is shown in the chemical formula 3 below.

[chemical formula 3]

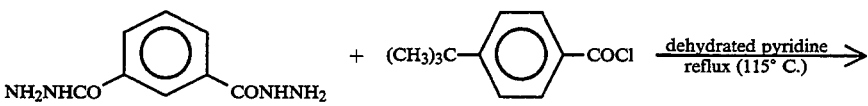

-continued
[chemical formula 3]

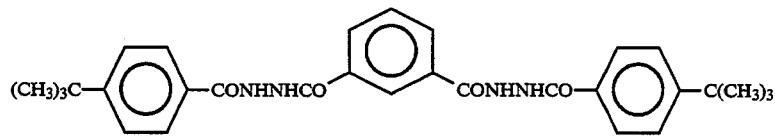

2. The synthesis of an oxadiazole

First, 10 g of the above oxadiazole precursor and then 100 ml of phosphorous oxychloride ($POCl_3$) are put in a three neck flask (capacity: 500 ml). Next, a cooling tube is attached to the mouth of the flask and the phosphorous oxychloride is refluxed for seven hours. After the reaction, the phosphorous oxychloride is removed from the system of reaction by distillation. The reactant is washed well by reacting any remaining phosphorous oxychloride with water. The reactant is vacuum dried in a vacuum desiccator. As a result, an oxadiazole is synthesized. The oxadiazole is purified by sublimation purification. The purification yield obtained in this case is 30%. The above reaction is shown in the chemical formula 4 below.

N: 11.63% (11.71%)

The melting point was at 242° C.

The organic EL element produced as above hereinafter referred to as the (A) element.

Experiment

When a positive bias was impressed on the hole injection electrode 2 of the above (A) element, blue electroluminescence with 465 nm of peak wavelength could be obtained.

High luminance of 600 $cd/m^2$ was confirmed under the conditions of a driving voltage of 17 V and a current density of 63 $mA/cm^2$.

The Second Embodiment

An EL element has the same structure, materials and

[chemical formula 4]

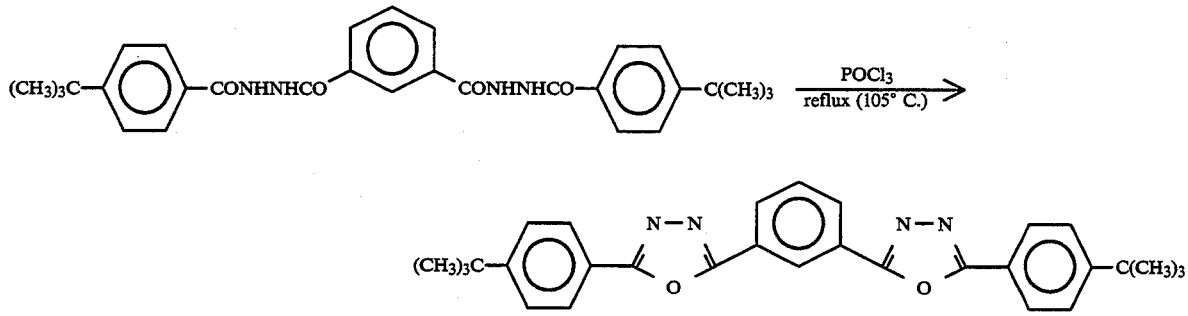

The elements of the above oxadiazole were analyzed and the results are shown below. In the parentheses are theoretical values.

H: 6.35% (6.32%)
C: 75.37% (75.29%)

the like as the above first embodiment except that the oxadiazole derivatives shown in the chemical formulas 5-13 below are used as materials for the organic luminous layer 4. The organic luminous layer 4 having a thickness of 400 Å is formed by vacuum evaporation.

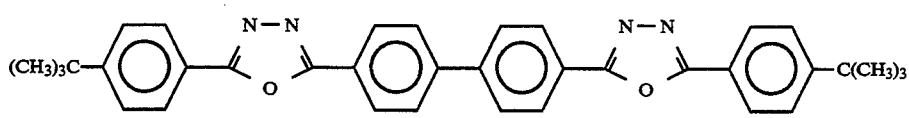

[chemical formula 5]

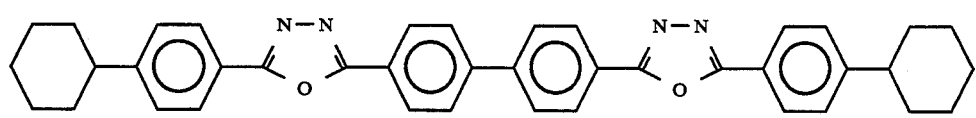

[chemical formula 6]

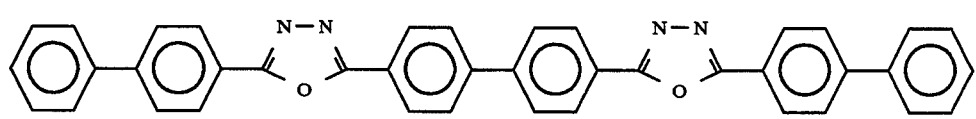

[chemical formula 7]

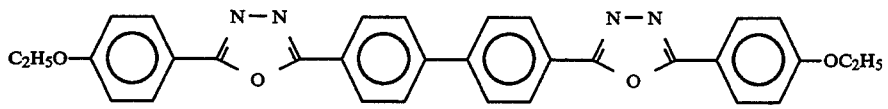

[chemical formula 8]

-continued

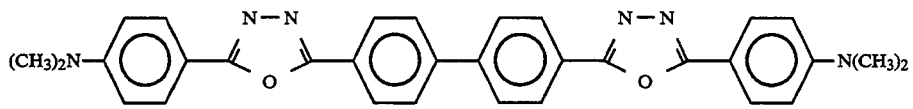
[chemical formula 9]

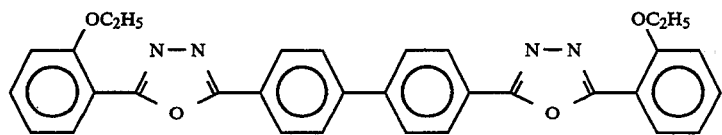
[chemical formula 10]

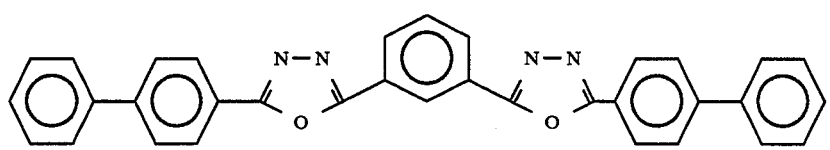
[chemical formula 11]

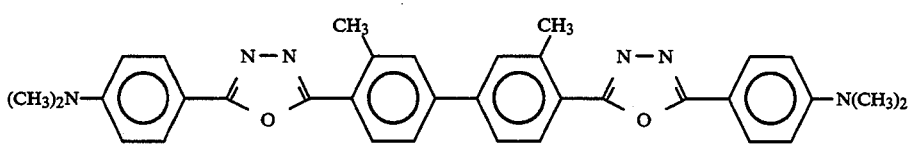
[chemical formula 12]

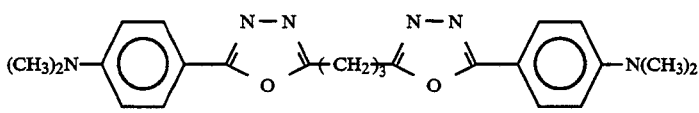
[chemical formula 13]

The organic EL element produced as above are hereinafter referred to as elements (B$_1$)–(B$_9$) respectively.

Experiment

Fluorescence (PL) of the oxadiazole derivative above, EL wavelength, luminance and luminous colors of the above (B$_1$)–(B$_9$) elements were checked. The results and the conditions of voltage and current density are shown in Table 1.

TABLE 1

| types of elements | PL of OXD (nm) | EL wave length (nm) | luminance (cd/m$^2$) | voltage (V) | current density (mA/cm$^2$) | luminous color |
|---|---|---|---|---|---|---|
| B$_1$ | 410 | 485 | 750 | 21 | 130 | blue |
| B$_2$ | 412 | 485 | 550 | 19 | 150 | blue |
| B$_3$ | 437 | 505 | 600 | 23 | 375 | blue-green |
| B$_4$ | 441 | 505 | 733 | 18 | 150 | blue-green |
| B$_5$ | 510 | 525 | 1800 | 14 | 150 | blue-green |
| B$_6$ | 414 | 492 | 2 | 18 | 22 | blue |
| B$_7$ | 391 | 465 | 130 | 18 | 75 | blue |
| B$_8$ | 508 | 510 | 1100 | 16 | 190 | blue-green |
| B$_9$ | 435 | 450 | 700 | 16 | 180 | blue |

As apparent from the above table 1, it was confirmed that (B$_1$)–(B$_9$) elements exhibit the color of blue or blue-green, and have high luminance. Also, it was confirmed through an experiment that (B$_1$) element–(B$_9$) element have excellent durability which is not illustrated.

Although the results of compounds having carbon number 3 only are described in the above embodiment concerning compounds having an alkyl chain between oxadiazole rings, compounds having carbon number 1–6 have the same good results. However, in the case of compounds having carbon number of more than seven, the compounds are hard to vacuum evaporate for producing EL element, or have some problems concerning their syntheses.

The Third Embodiment

Example 1

As shown in FIG. 2, an EL element has the same structure, materials and the like as the above first embodiment except that the oxadiazole derivative expressed by the chemical formula 14 below is used as a material for the organic luminous layer 4 which has an a thickness of 100 Å and the EL element has an organic three-layer structure comprising the organic luminous layer 4, the electron injection electrode 5 and an organic electron transport layer 6 (thickness: 300 Å) made of the oxadiazole derivative (expressed by the above chemical formula 2) disposed therebetween.

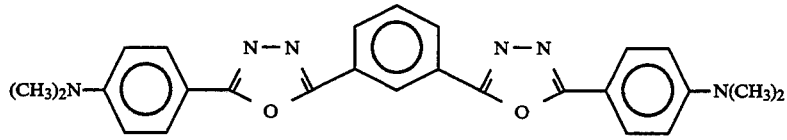
[chemical formula 14]

The organic EL element produced as above is hereinafter referred to as the (C$_1$) element.

Example 2

An EL element has the same structure, materials and the like as the above example 1 except that the oxadiazole derivatives expressed by chemical formulas 15 and 16 are used as materials for the organic luminous layer 4.

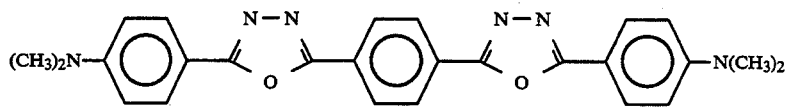

[chemical formula 15]

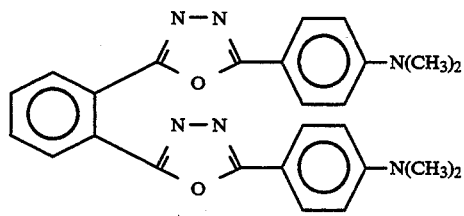

[chemical formula 16]

The EL elements produced as above hereinafter referred to as the (C2) element and the (C3) element respectively.

Experiment

Fluorescence (PL) of the oxadiazole derivative above, EL wavelength, luminance and luminous colors of the above (C1)–(C3) elements were checked. The results and the conditions of voltage and current density are shown in Table 2.

The EL wavelength was measured by impressing a positive bias on the hole injection electrode 2.

TABLE 2

| types of elements | PL of OXD (nm) | EL wave length (nm) | luminance (cd/m$^2$) | voltage (V) | current density (mA/cm$^2$) | luminous color |
|---|---|---|---|---|---|---|
| C1 | 469 | 475 | 1000 | 16 | 100 | blue |
| C2 | 527 | 521 | 4000 | 17 | 300 | blue-green |
| C3 | 450 | 455 | 1000 | 16 | 200 | blue |

The reason for being able to gain extremely high luminance as shown in Table 2 is considered to result from that charge carriers and excitons can be firmly enclosed within the organic luminous layer 4 with the organic three-layer structure.

The Forth Embodiment

Example 1

An EL element has the same structure, materials and the like as the above example 1 of the third embodiment except that it has a SH-B structure having the organic luminous layer 4 of a thickness of 500 Å and the electron transport layer 6 of a thickness of 400 Å, not having a hole transport layer as shown in FIG. 3.

The organic EL element produced as above is hereinafter referred to as the (D1) element.

Example 2

An EL element has the same structure, materials and the like as the (C2) element of the above example 2 of the third embodiment except that it has a SH-B structure having the organic luminous layer 4 of a thickness of 500 Å and the electron transport layer 6 of a thickness of 400 Å, not having a hole transport layer as shown in FIG. 3.

The organic EL element produced as above is hereinafter referred to as the (D2) element.

Experiment

When positive biases were impressed on the hole injection electrode 2 of the above (D1) and (D2) elements, blue electroluminescence with 486 nm of peak wavelength and blue-green electroluminescence with 534 nm of peak wavelength could be gained respectively.

It was confirmed that the (D1) element has 2080 cd/m2 of luminance under the conditions of 18 V of driving voltage and 300 mA/cm2 of current density, and the (D2) element has 2100 cd/m2 of luminance under the conditions of 17 V of driving voltage and 200 mA/cm2 of current density.

The Fifth Embodiment

FIG. 4 shows an EL element structure which uses oxadiazole compounds as a hole transport layer 13. A hole injection electrode (positive electrode) 12 made from an oxide of In—Sn (ITO) is formed on a glass substrate 11, an organic hole transport layer 13 (thickness: 500 Å) made from the oxadiazole compounds expressed by the chemical formula 17 is formed thereon, an organic luminous layer 4 (thickness: 500 Å) made from 8-Hydroxyquinoline aluminum expressed by the chemical formula 18 below is further provided thereon, and an electron injection electrode 16 (negative electrode, thickness: 2000 Å) in which Mg and Ag are mixed at the ratio of 10:1 is finally provided thereon.

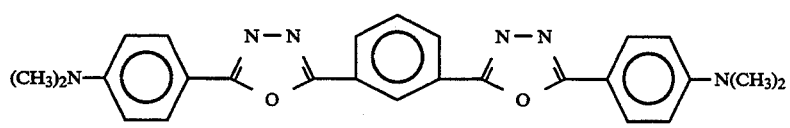

[chemical formula 17]

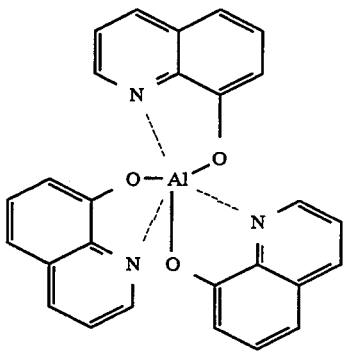

An EL element with the above structure is produced as follows.

First, the glass substrate 11 having In—Sn oxide (ITO) thereon was cleaned with neutral detergent and ultrasonic cleaned in acetone for 20 minutes and in ethanol for about 20 minutes. Next, the substrate was put into boiling ethanol for about 1 minute, then removed, and immediately dried by hot air. The hole transport layer 13 was formed by vacuum evaporating oxadiazole compounds on the hole injection electrode 12 which was made from the above ITO, then the organic luminous layer 14 was formed by vacuum evaporating 8-Hydroxyquinoline aluminum on the organic hole transport layer 13. Further, an electron injection electrode 15 was formed by evaporating Mg and Ag together at the ratio of 10:1. These evaporations were all conducted under the conditions of $1 \times 10^{-6}$ Torr of vacuum, 20° C. of the substrate temperature and 2 Å/sec of evaporating speed of the organic layers. The above oxadiazole compound was formed through a process of the synthesis of the oxadiazole compound precursor.

1. The synthesis of an oxadiazole compound precursor

First, 10.31 g (57.53 mmol) of 4-Dimethylaminobenzhydrazide and then 100 ml of dehydrated pyridine are put in a three neck flask (capacity: 500 ml). Next, a cooling tube is attached to the mouth of the flask and $N_2$ gas is installed inside. 4-Dimethylaminobenzhydrazide was dissolved in the pyridine by mixing at a room temperature. Further, 6.26 g (30.83 mmol) of Isophthaloyl Chloride was added to the system of reaction from a side tube of the three neck flask, and for 8 hours the pyridine was refluxed. After the reaction is done, pyridine is removed from the system of reaction by distillation. The reactant is washed well and is vacuum dried in a vacuum desiccator. Consequently an oxadiazole precursor is formed. The above reaction is expressed by the chemical formula 19 below.

[chemical formula 19]

2. The synthesis of an oxadiazole compound.

First, 13.23 g of the above oxadiazole precursor and then 100 ml of phosphorous oxychloride ($POCl_3$) are put in a three neck flask (capacity: 500 ml). Next, a cooling tube is attached to the mouth of the flask and the phosphorous oxychloride is refluxed for 6 hours. After the reaction, the phosphorous oxychloride is removed from the system of reaction by distillation. The reactant is washed well by reacting any remaining phosphorous oxychloride with water. The reactant is vacuum dried in a vacuum desiccator. As a result, an oxadiazole compound is synthesized. The oxadiazole is purified by sublimation purification. The purification yield gained in this case is 23%. The above reaction is expressed by the chemical formula 20 below.

[chemical formula 20]

-continued
[chemical formula 20]

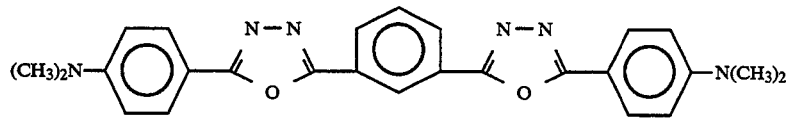

The elements of the above oxadiazole were analyzed and the results are shown below. In the parentheses are theoretical values.
H: 5.37% (5.35%)
C: 69.00% (69.01%)
N: 16.66% (18.57%)

The melting point was at 329° C.

The organic EL element produced as above hereinafter is referred to as the (A$_5$) element.

The Sixth Embodiment

An EL element was produced in the same manner as the above fifth embodiment except that the oxadiazole compound expressed by the chemical formula 21 below was used as a material for the hole transport layer.

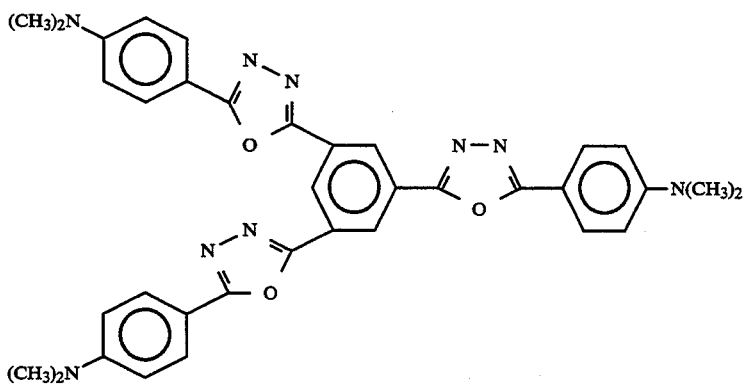

[chemical formula 21]

This element is hereinafter referred to as the (A$_6$) element.

The Seventh Embodiment

An EL element was produced in the same manner as the above fifth embodiment except that the oxadiazole compound expressed by the chemical formula 22 was used as a material for the hole transport layer and the perinone derivative expressed by the chemical formula 23 was used as a material for the luminous layer.

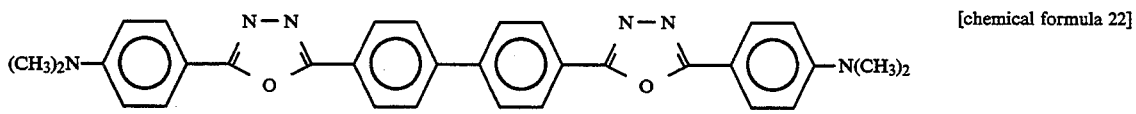
[chemical formula 22]

[chemical formula 23]

This element is hereinafter referred to as the (A$_7$) element.

The Eighth Embodiment

An EL element was produced in the same manner as the above fifth embodiment except that the oxadiazole compound expressed by the chemical formula 24 below is used as a material for the hole transport layer and the perylene derivative expressed by the chemical formula 25 is used as a material for the luminous layer.

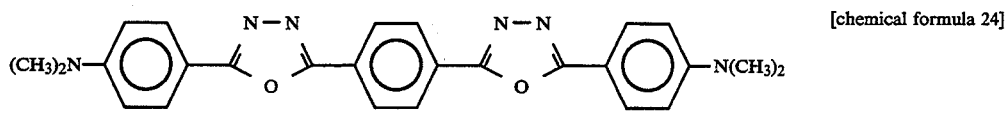
[chemical formula 24]

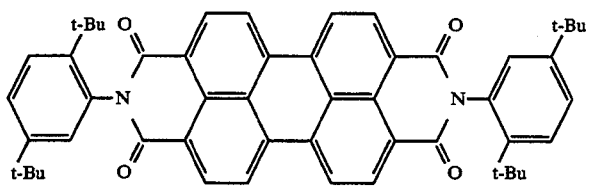

This element is hereinafter referred to as the (A₈) element.

Comparative Example 1

An EL element was produced in the same manner as the above fifth embodiment except that the compound containing one oxadiazole ring expressed by the chemical formula 26 below is used as a material for the hole transport layer.

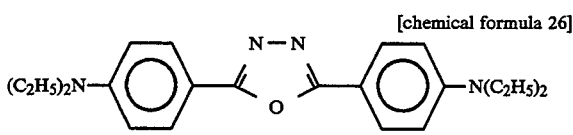

[chemical formula 26]

This element is hereinafter referred to as the ($X_1$) element.

Comparative Example 2

An EL element was produced in the same manner as the above seventh embodiment except that the diamine derivative expressed by the chemical formula 27 below is used as a material for the hole transport layer.

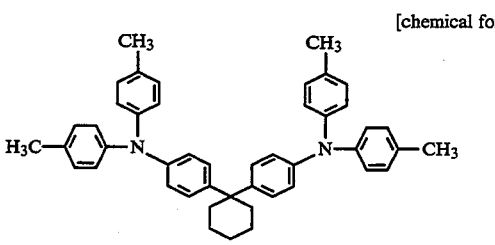

[chemical formula 27]

This element is hereinafter referred to as the ($X_2$) element.

Experiment

Luminance, EL peak wavelength and durability of each element of ($A_5$)–($A_8$) and comparative example ($X_1$) and ($X_2$) were measured by impressing a positive bias on the hole injection electrode and a negative bias on the electron injection electrode.

Table 3 shows the driving voltage, current density and the measured results.

FIG. 5 shows spectral characteristics of ($A_5$) element.

TABLE 3

| types of elements | El wave length (nm) | luminance (cd/m²) | voltage (V) | current density (mA/cm²) | luminous color | luminous durabilily |
|---|---|---|---|---|---|---|
| A₅ | 535 | 2000 | 18 | 100 | green | 7 days |
| A₆ | 536 | 1800 | 18 | 120 | green | 10 days |
| A₇ | 590 | 1000 | 16 | 100 | yellow | 3 days |
| A₈ | 630 | 200 | 17 | 150 | red | 3 days |
| X₁ | 533 | 1500 | 17 | 100 | green | 1 hour |
| X₂ | 588 | 900 | 17 | 130 | yellow | 1 day |

[chemical formula 25]

As apparent from table 3, ($A_5$)–($A_8$) elements have longer life and more stable than the comparative ($X_1$) and ($X_2$) elements.

When the surface of the comparative example ($X_1$) element was seen under a microscope, crystallite was found.

It was confirmed through these that the hole transport materials in the present embodiments have better film forming characteristics and are more stable even during operation.

Other Examples

The same effects also can be expected from the following compounds which are not examined in the above embodiments, which use the following materials for the hole transport layer (1) oxadiazole series compounds having an alkyl chain of carbon number n between (2) oxadiazole rings expressed by chemical formula 28, oxadiazole series compounds having oxadiazole rings substituted at ortho positions (1 and 2) of benzene rings expressed by the chemical formula 29 and (3) oxadiazole series compounds having oxadiazole rings substituted at 2- and 2'-positions of a biphenyl group expressed by the chemical formula 30.

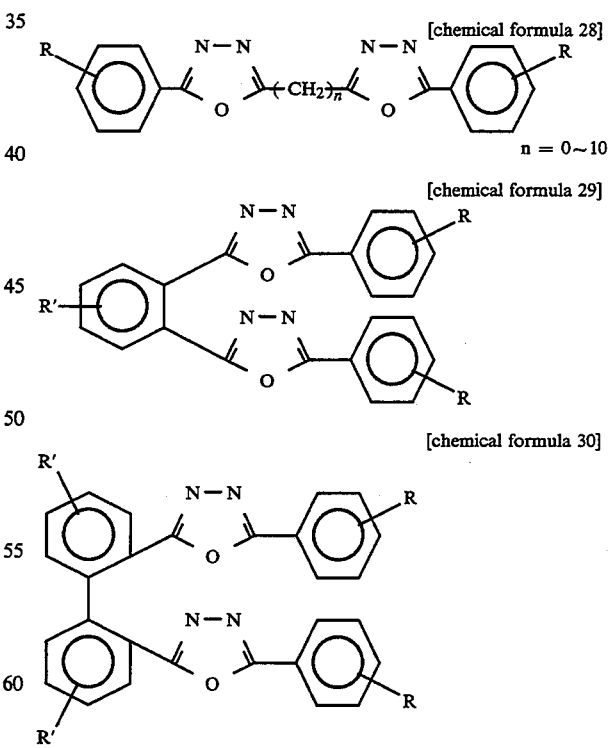

R in the chemical formulas 28–30 is selected from the group consisting of $NH_2$, $N(CH_3)$ and $N(C_2H_5)_2$.

The following can be used for $R^1$- H, $C_nH_{2n+1}$(n=1–10), $OCH_3$, $OC_2H_5$, phenyl (shown in the chemical formula 31), cyclohexyl (shown in the chemical formula 32) and oxadiazole series compounds having alkyl chains of carbon number n between the oxadiazole rings having carbon number n=0–10. Those having alkyl chains of carbon number n=1–6 are especially preferable.

[chemical formula 31]

[chemical formula 32]

FIG. 6 is a sectional view of an EL element according to the ninth embodiment. A hole injection electrode (positive electrode) 22 made from an oxide of In—Sn (ITO) is formed on a glass substrate 21, an organic hole transport layer 23 (thickness: 600 Å) made from diamine expressed by the chemical formula 33 is formed thereon, the organic luminous layer 24 (thickness: 100 Å) made from 1,1,4,4,-tetraphenyl-1, 3-butadiene expressed by the chemical formula 34 below is further provided thereon, an organic electron transport layer 25 (thickness: 300 Å) made from an oxadiazole expressed by the chemical formula 35 is provided again thereon, and the electron injection electrode 26 (negative electrode, thickness: 2000 Å) in which Mg and Ag are mixed at the ratio of 10:1 is finally provided thereon.

An EL element with the above structure is produced as follows.

First, the glass substrate 21 having In—Sn oxide (ITO) thereon was cleaned with neutral detergent and ultrasonically cleaned in acetone for 20 minutes and in ethanol for about 20 minutes. Next, the substrate was put in boiling ethanol for about 1 minute, then removed, and immediately dried by hot air. The hole transport layer 23 was formed by vacuum evaporating diamine on the hole injection electrode 22 which was made from the above ITO, then the organic luminous layer 24 and an organic electron transport layer 25 were formed by vacuum evaporating 1,1,4,4,-tetraphenyl-1, 3-butadiene and oxadiazole in the order on the organic transport layer 23. Further, the electron injection electrode 26 was formed by evaporating Mg and Ag together at the ratio of 10:1. These evaporations were all conducted under the conditions of $1 \times 10^{-6}$ Torr of vacuum, 20° C. for the substrate temperature and 2 Å/sec as the evaporating speed for the organic layers. The above oxadiazole was formed through a process of the synthesis of an oxadiazole precursor.

1. The synthesis of an oxadiazole precursor

First, 12.37 g (63.7 mmol) of Isophthalic Dihydrazide and then 100 ml of dehydrated pyridine are put in a three neck flask (capacity: 500 ml). Next, a cooling tube is attached to the mouth of the flask and $N_2$ gas is introduced inside. The pyridine is refluxed using the $N_2$ atmosphere. Under these conditions, 24.37 g (125.7 mmol) of 4-tert-Butylbenzoyl chloride is dropped from a dropping funnel for thirty minutes. The refluxing is carried out continuously for ten hours after the dropping is done. After the reaction is done, the pyridine is removed from the system of reaction. The reactant is washed well and is vacuum dried in a vacuum desiccator. Consequently an oxadiazole precursor is formed. The above reaction is expressed by the chemical formula 36 below.

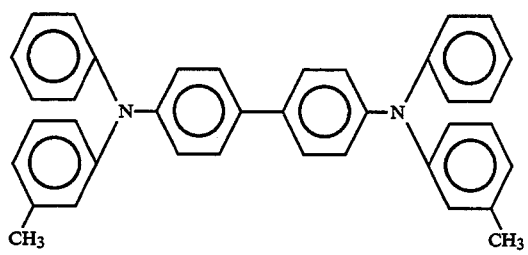

[chemical formula 33]

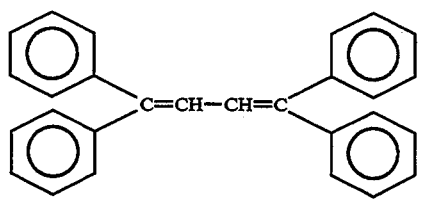

[chemical formula 34]

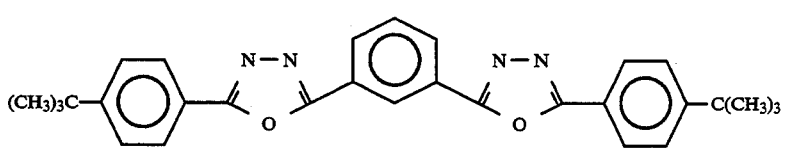

[chemical formula 35]

[chemical formula 36]

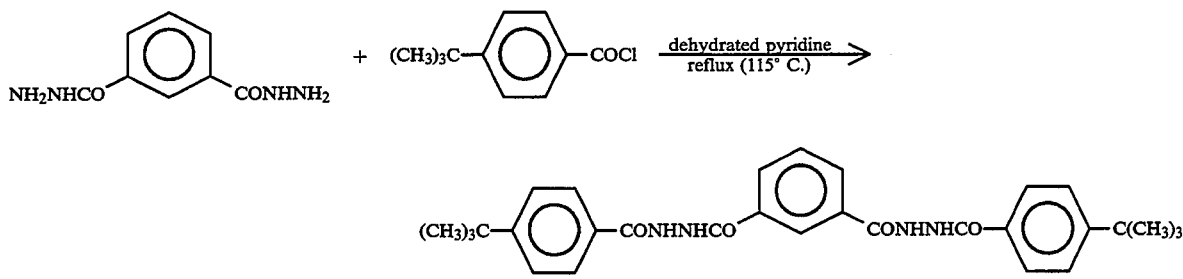

2. The synthesis of an oxadiazole

First, 10 g of the above oxadiazole precursor and then 100 ml of phosphorous oxychloride (POCl$_3$) are put in a three neck flask (capacity: 500 ml). Next, a cooling tube is attached to the mouth of the flask and the phosphorous oxychloride is refluxed for seven hours. After the reaction, the phosphorous oxychloride is removed from the system of reaction by distillation. The reactant is washed well by reacting any remaining phosphorous oxychloride with water. The reactant is vacuum dried in a vacuum desiccator. As a result, an oxadiazole is synthesized. The oxadiazole is purified by sublimation purification. The purification yield gained in this case is 30%. The above reaction is expressed by the chemical formula 37 below.

The organic EL produced as above is hereinafter referred to as (X$_3$) element.

Experiment

When a positive bias was impressed on the hole injection electrode 2 of the above (A$_9$) element of the present invention and (X$_3$) element of the comparative example, blue luminescence with 460 nm of peak wavelength could be gained.

It was confirmed that (A$_9$) element has luminance of 700 cd/m$^2$ under the conditions of driving voltage of 10 V and current density of 100 mA/cm$^2$, while (X$_3$) element has luminance of 500 cd/m$^2$ under the conditions of driving voltage of 12 V and current density of 100 mA/cm$^2$.

It was confirmed through these experiments that

[chemical formula 37]

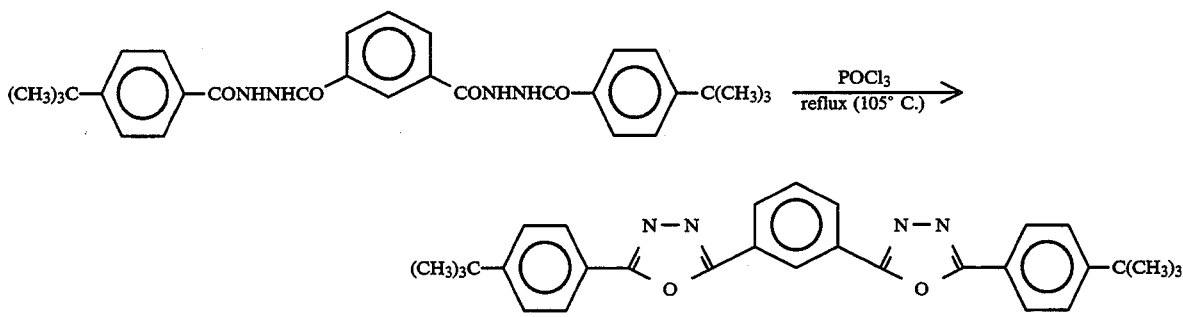

The elements of the above oxadiazole were analyzed and the results are shown below. In the parentheses are theoretical values.
H: 6.35% (6.32%)
C: 75.37% (75.29%)
N: 11.63% (11.71%)

The melting point was at 242° C.

The organic EL element produced as above hereinafter referred to as (A$_9$) element.

Comparative Example 3

An EL has the same structure, materials and the like as the EL of the above ninth embodiment except that tBu-PBD expressed by the chemical formula 38 below is used as a material for the organic electron transport layer 25. The organic electron transport layer 25 has a thickness of 300 Å.

there is little difference between (A$_9$) element of the present invention and (X$_3$) element of the comparative example.

(A$_9$) element and (X$_3$) element were preserved under vacuum. It was confirmed as a result that two days later, (A$_9$) element has the same luminescence characteristics and stability as above when voltage was impressed on the element under the same conditions as above. However, no luminescence was found when voltage was impressed on (X$_3$) element under the same conditions 12 hours later. It was confirmed that a lot of crystallite was precipitated to destroy the element when the surface of (X$_3$) element was seen under a microscope. That seems to prove that no luminescence happened.

The Tenth Example

Example 1

As shown in FIG. 7, a hole injection electrode 32 is formed on a glass substrate 31. An organic luminous layer 34 (thickness: 500 Å) made from a triphenyl-amine derivative (shown in the chemical formula 39) which has hole transport characteristics and is a luminescent

[chemical formula 38]

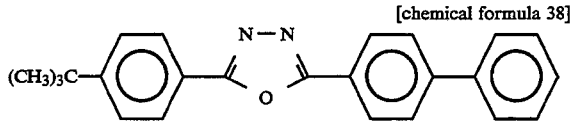

material is formed thereon. An organic electron transport layer 35 (thickness: 500 Å) made from oxadiazole (expressed by the chemical formula 40) is further provided thereon. Finally an electron injection electrode 36 (thickness: 2000 Å) made of the same materials as the above ninth embodiment is formed thereon.

The above organic luminous layers 34 and the like are produced by evaporation under the same conditions as the above ninth embodiment.

The results of their luminance are as follows.

It was confirmed that the (B) element has luminance of 1000 cd/m² under the conditions of 13 V of driving voltage and 100 mA/cm² of currency density.

It was confirmed that the (C) element has luminance of 1100 cd/m² under the conditions of 15 V of driving voltage and 150 mA/cm² of currency density.

It was confirmed that the (D) element has luminance of 800 cd/m² under the conditions of 14 V of driving voltage and 130 mA/cm² of currency density.

It was confirmed that (E) element has luminance of 600 cd/m² under the conditions of 15 V of driving voltage and 100 mA/cm² of currency density.

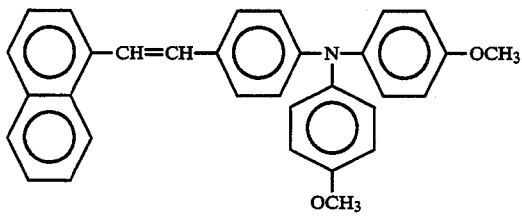

[chemical formula 39]

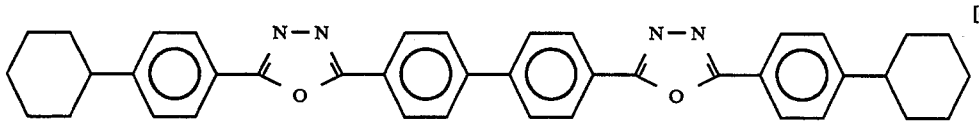

[chemical formula 40]

The EL element produced as above is hereinafter referred to as the (B) element.

Example 2

An EL element was produced in the same manner as the above tenth embodiment except that the compounds expressed by the chemical formulas 41–43 below were used as materials for the organic electron transport layer 35.

Therefore, it was confirmed that good luminescence can be gained also in the case of EL element having two-layer structure by using electron transport materials of the present invention.

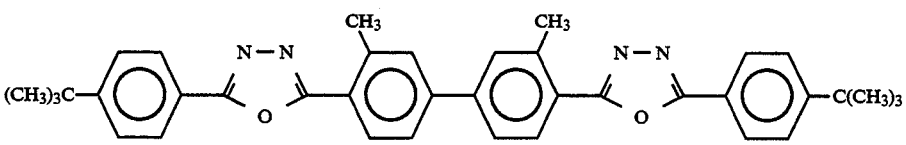

[chemical formula 41]

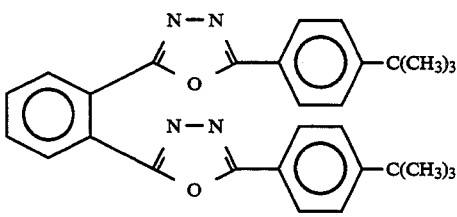

[chemical formula 42]

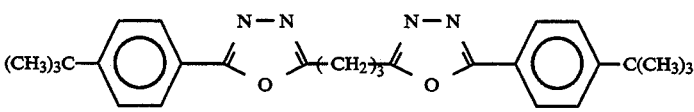

[chemical formula 43]

Organic EL elements produced as above are respectively referred to as the (C) element, (D) element and (E) element hereinafter.

Experiment

Each peak wavelength and luminance of the above (B) element, (C) element (D) element and (E) element were measured.

The wavelength was measured by impressing a positive bias on the hole injection electrode 32 of each element.

As a result, (B) (C) (D) and (E) elements could gained green luminescence of 500 nm, 505 nm, 508 nm and 503 nm as each peak respectively.

Although the results of the compounds having carbon number 3 only were described in the above embodiments concerning compounds having an alkyl chain between oxadiazole rings, compounds having carbon number 1–6 have the same good results. However, in the case of compounds having carbon number of more than seven, the compounds are hard to vacuum evaporate for producing EL element, or have some problems concerning their synthesis.

In the above first, fifth and ninth embodiments, each producing method of an oxadiazole series compound was explained. General methods of synthesizing are shown in the chemical formulas 44 and 45 below.

[chemical formula 44]
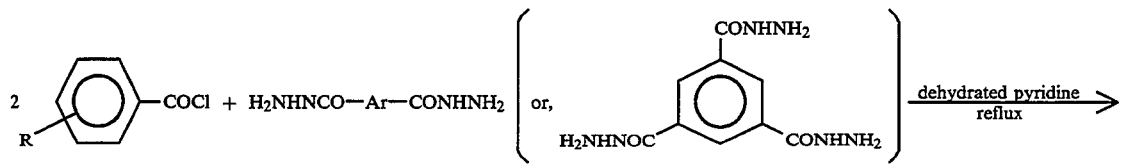
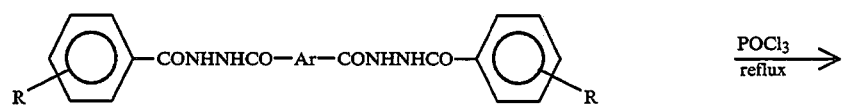
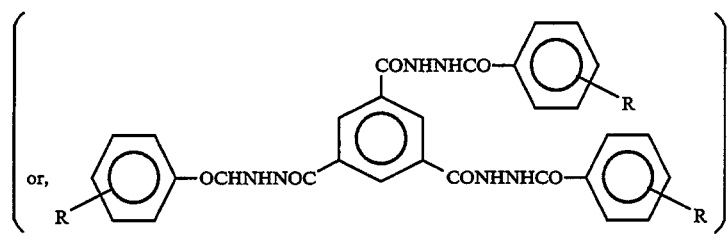
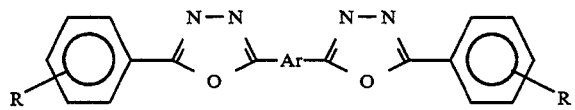
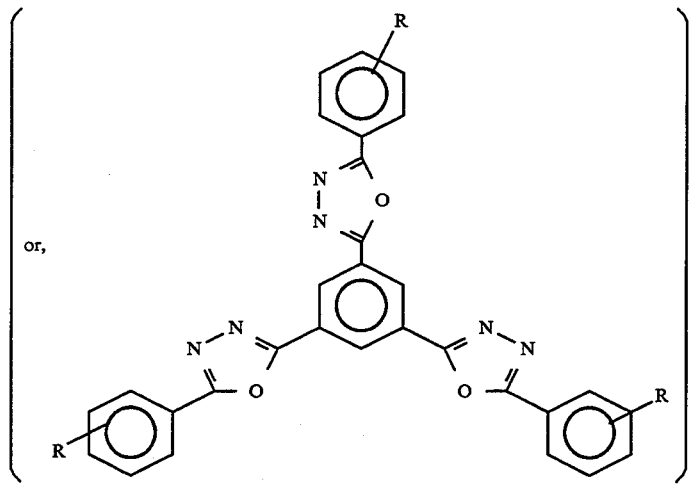
[chemical formula 45]
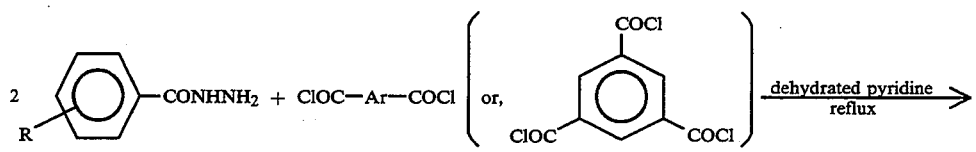

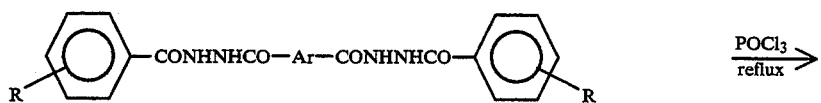

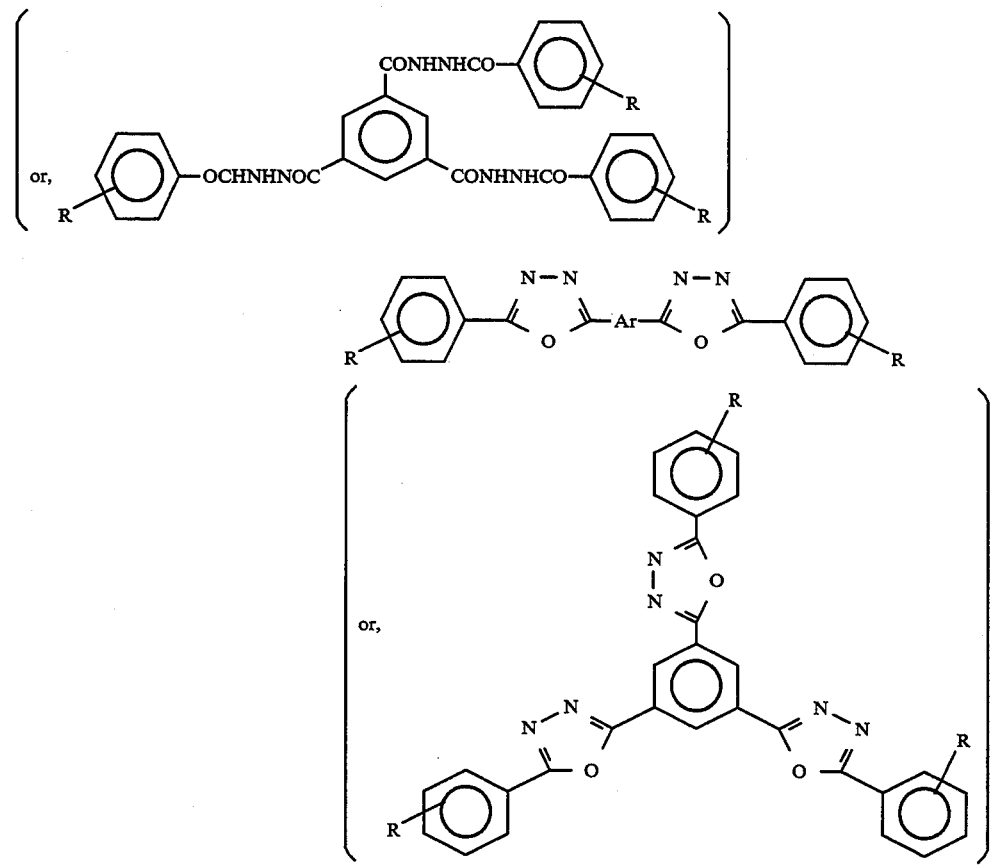

The above Ar is selected from the chemical formulas 46–51 below.

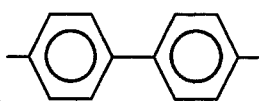
[chemical formula 46]

[chemical formula 47]

[chemical formula 48]

[chemical formula 49]

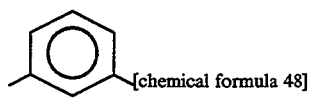
[chemical formula 50]

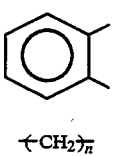

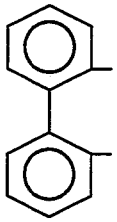
[chemical formula 51]

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. An organic EL element, comprising:
   an electron injection electrode;
   a hole injection electrode; and
   at least one layer made from an organic material between the electron injection and the hole injection electrode, the organic material being selected from the group consisting of (i) an oxadiazole series compound having a plurality of oxadiazole rings and one benzene ring between the oxadiazole rings, (ii) an oxadiazole series compound having a plurality of oxadiazole rings and two benzene rings between the oxadiazole rings, and (iii) an oxadiazole series compound having a plurality of oxadiazole rings and an alkyl chain between the oxadiazole rings.

2. An EL element in claim 1, wherein at least two layers made from organic materials are present, wherein the layers made from organic materials include an organic luminous layer and an electron transport layer, the electron transport layer being provided between the organic luminous layer and the electron injection electrode.

3. An EL element in claim 2, wherein the organic luminous layer comprises the oxadiazole series compounds.

4. An EL element in claim 3, wherein the organic luminous layer comprises an oxadiazole series compound having a plurality of oxadiazole rings and one benzene ring between the oxadiazole rings.

5. An EL element in claim 4, wherein the number of said oxadiazole rings is 2, the benzene ring being substituted by the oxadiazole rings at one of ortho position (1,2), meta position (1,3) and para position (1,4).

6. An EL element in claim 5, wherein the benzene ring, which is substituted by the oxadiazole rings at the two positions, is substituted by the oxadiazole ring at one more position.

7. An EL element in claim 4, wherein the number of the oxadiazole rings is 3, the benzene ring being substituted by the oxadiazole rings at 1, 3 and 5 positions.

8. An EL element in claim 3, wherein the organic luminous layer comprises an oxadiazole series compound having a plurality of oxadiazole rings and two benzene rings between the oxadiazole rings.

9. An EL element in claim 8, wherein the number of said oxadizole rings is 2, and a biphenyl group which includes two benzene rings is substituted by the oxadiazole at either the 4- and 4'- or 2- and 2'- positions.

10. An EL element in claim 3, wherein the organic luminous layer comprises an oxadiazole series compound having a plurality of oxadiazole rings and an alkyl chain between the oxadiazole rings.

11. An EL element in claim 10, wherein the number of said oxadizole rings is 2, the carbon number of an alkyl chain between the oxadiazole rings being 1-6.

12. An EL element in claim 3, wherein the oxadiazole series compounds are selected from the group consisting of the chemical formulas shown below:

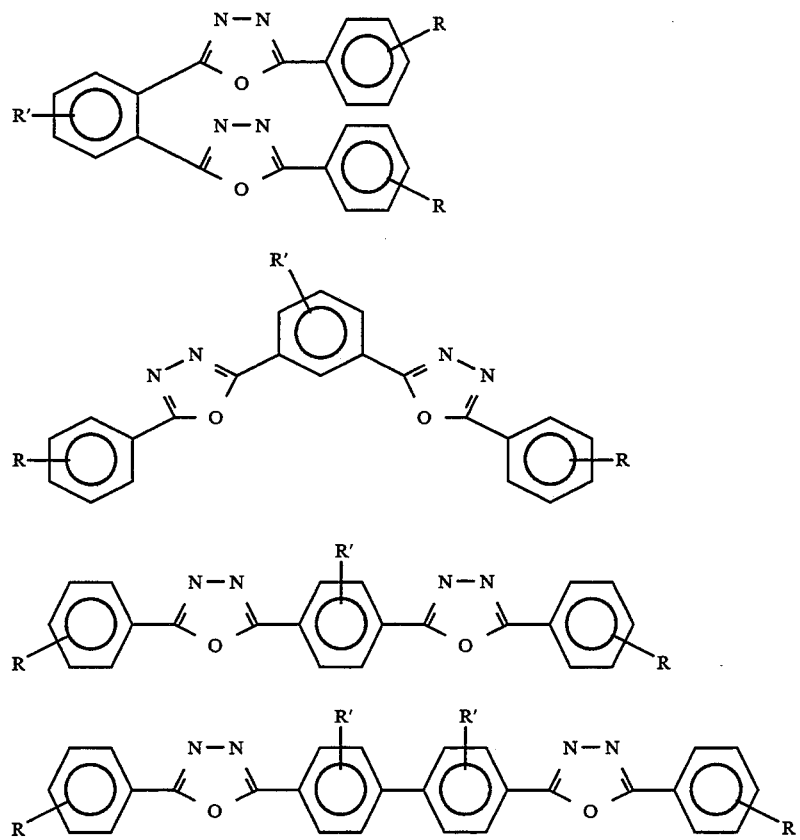

-continued
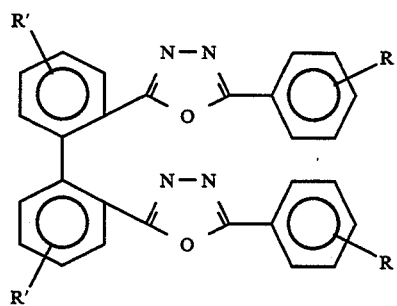
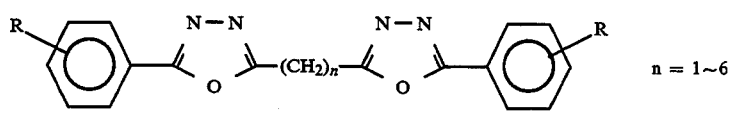
n = 1~6
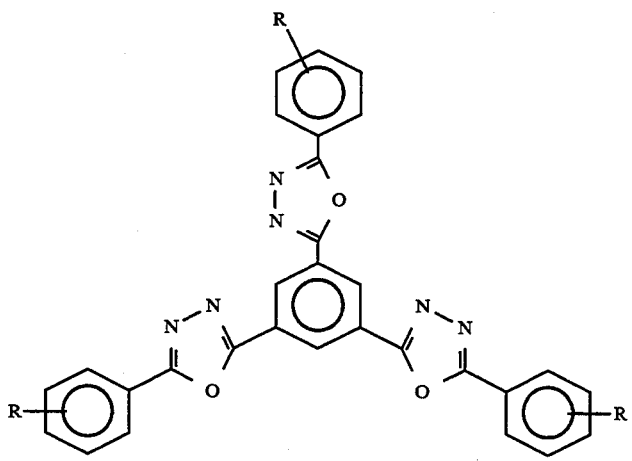
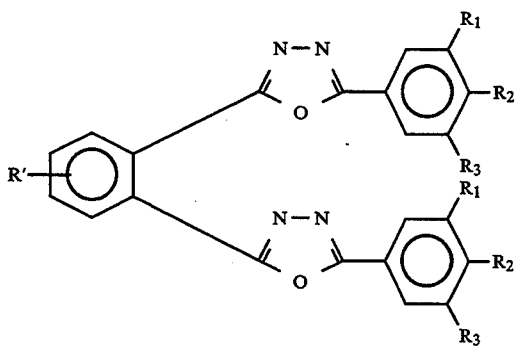
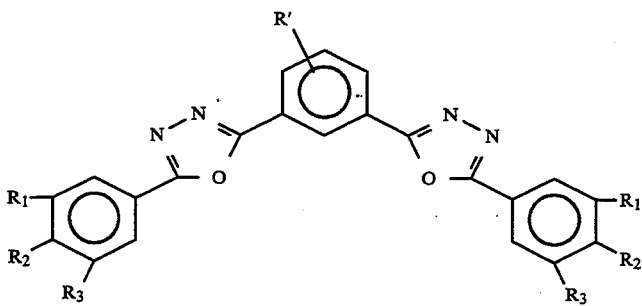

-continued

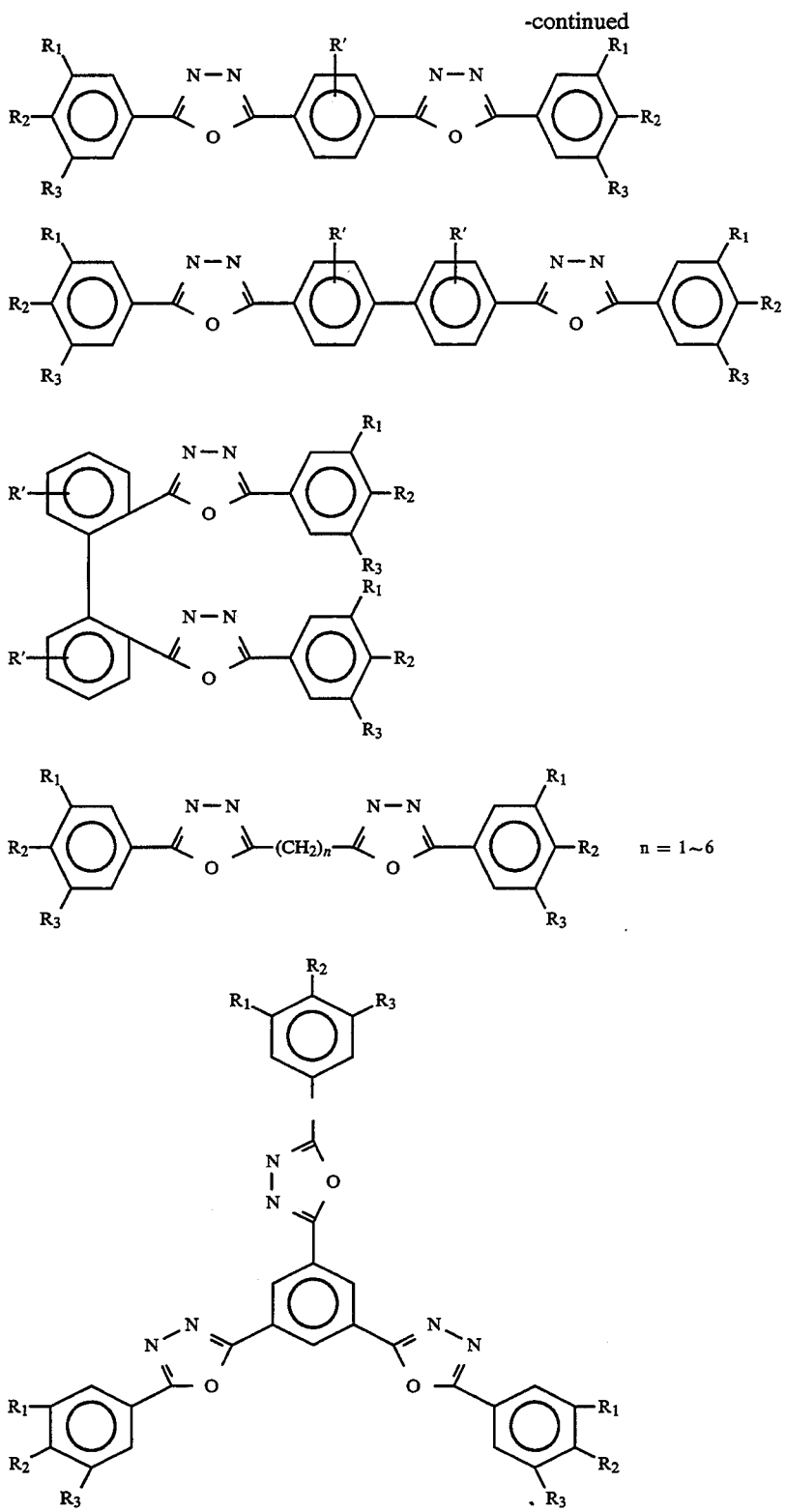

wherein R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl, and R' is selected from the group consisting of H, $CH_3$, $C_2H_5$, $OCH_3$, $OC_2H_5$, $N(CH_3)_2$ and an oxadiazole ring.

13. An EL element in claim 2, wherein the electron transport layer comprises the oxadiazole series compounds.

14. An EL element in claim 13, wherein the electron transport layer comprises an oxadiazole series compound having a plurality of oxadiazole rings and one benzene ring between the oxadiazole rings.

15. An EL element in claim 14, wherein the number of said oxadiazole rings is 2, the benzene ring being substituted by the oxadiazole rings at one of ortho position (1,2), meta position (1,3) and para position (1,4).

16. An EL element in claim 15, wherein the benzene ring, which is substituted by the oxadiazole rings at the two positions, is substituted by the oxadiazole ring at one more position.

17. An EL element in claim 14, wherein the number of the oxadiazole rings is 3, the benzene ring being substituted by the oxadiazole rings at 1, 3 and 5 positions.

18. An EL element in claim 13, wherein the electron transport layer comprises an oxadiazole series compound having a plurality of oxadiazole rings and two benzene rings between the oxadiazole rings.

19. An EL element in claim 18, wherein the number of the oxadiazole rings is 2, a biphenyl group which includes the two benzene rings being substituted by the oxadiazole at either the 4- and 4'- or 2- and 2'- positions.

20. An EL element in claim 13, wherein the electron transport layer comprises an oxadiazole series compound having a plurality of oxadiazole rings and an alkyl chain between the oxadiazole rings.

21. An EL element in claim 20, wherein the number of the oxadiazole rings is 2, the carbon number of an alkyl chain between the oxadiazole rings being 1–6.

22. An EL element in claim 13, wherein the oxadiazole series compounds are selected from the group consisting of the chemical formulas shown below:

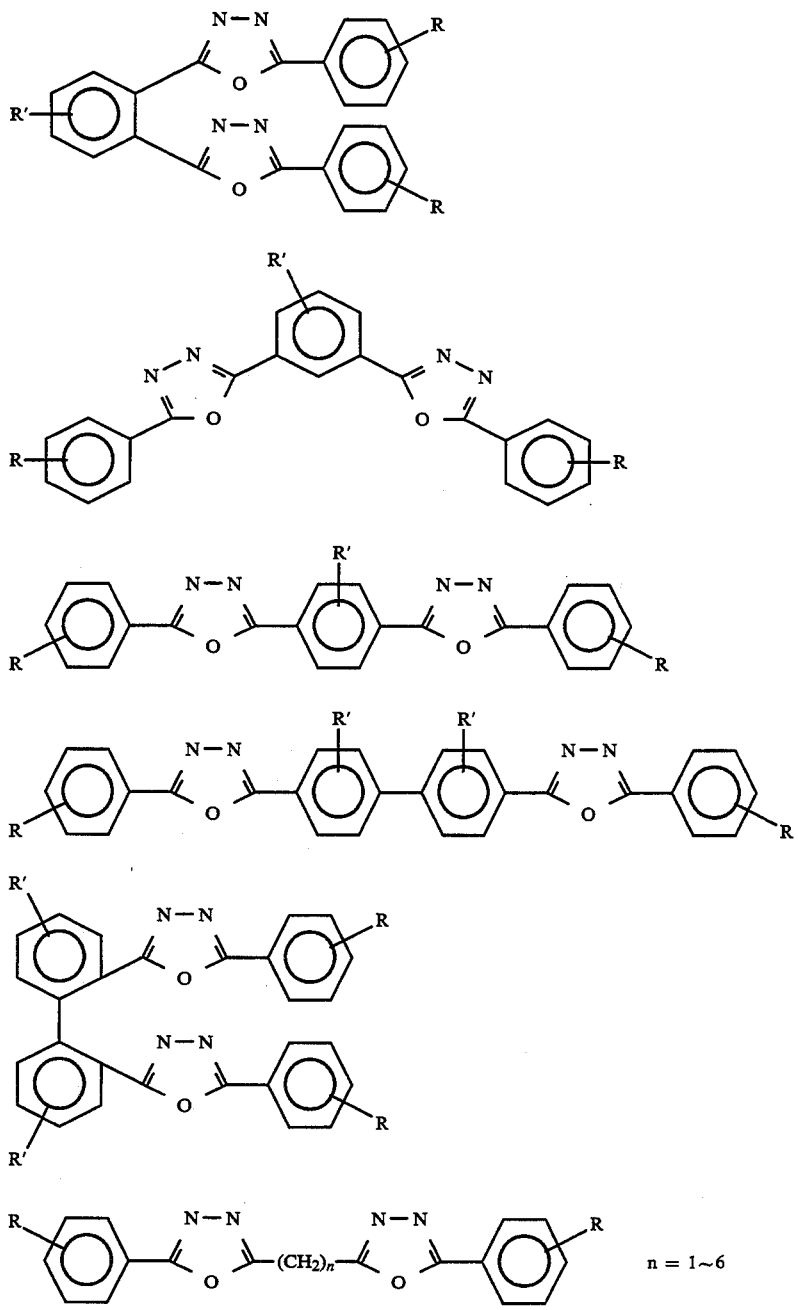

-continued
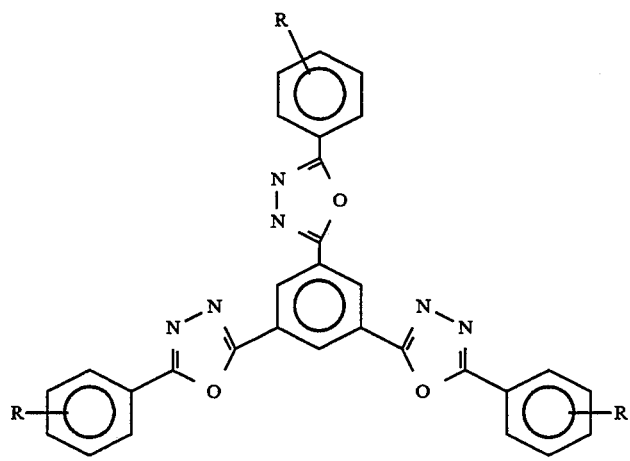
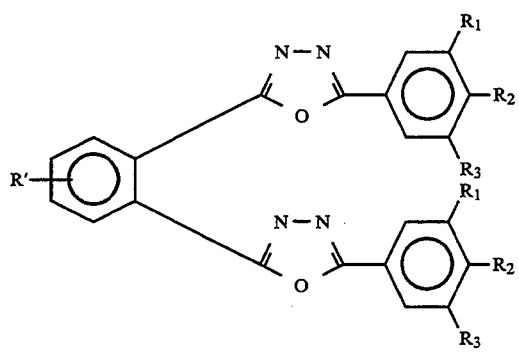
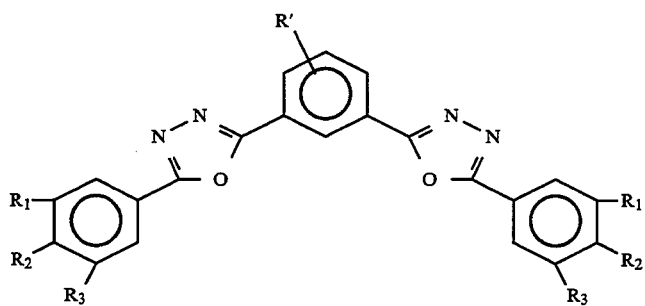
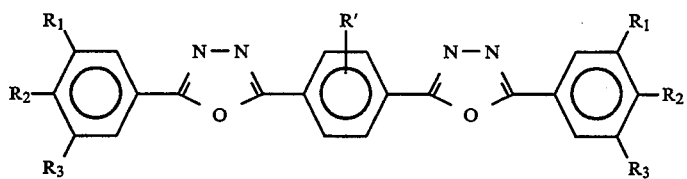
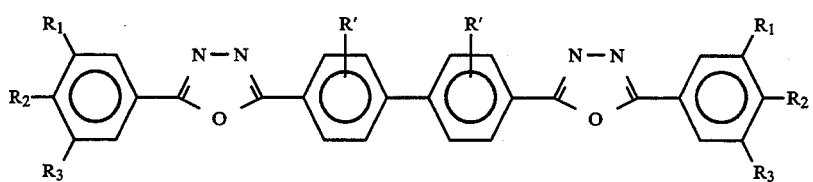

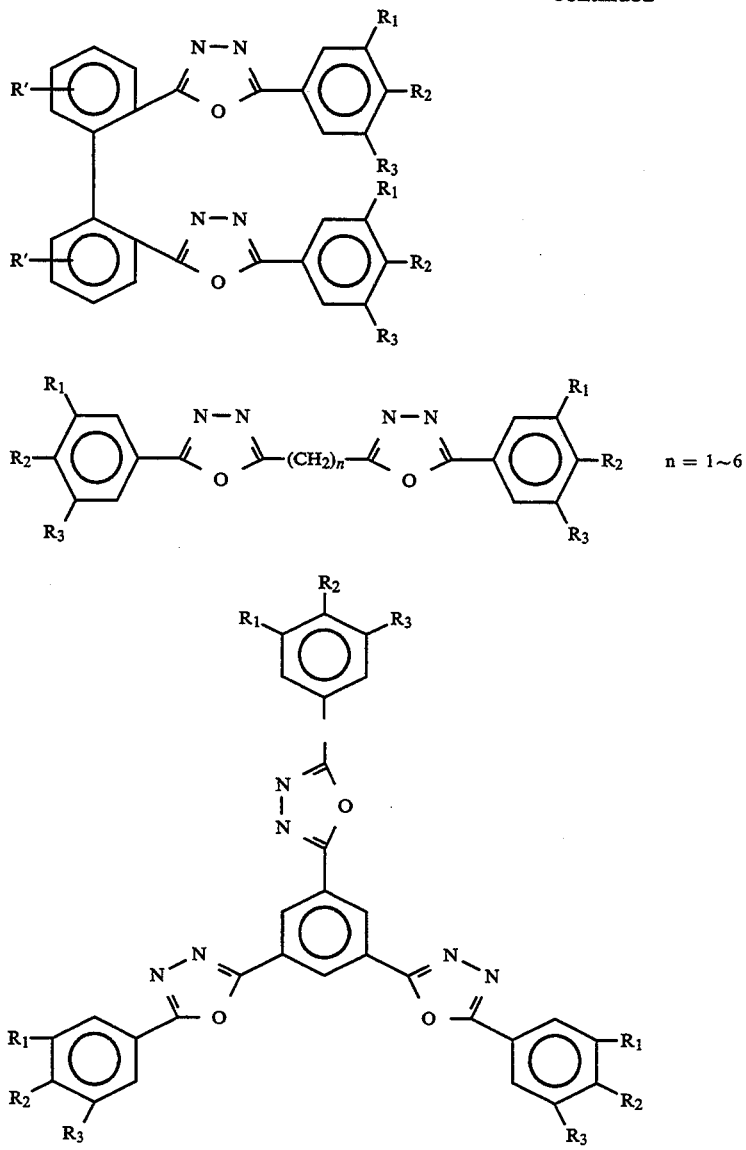

wherein R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl, and R' is selected from the group consisting of H, $CH_3$, $C_2H_5$, $OCH_3$, $OC_2H_5$, $N(CH_3)_2$ and an oxadiazole ring.

23. An EL element in claim 13, wherein the organic compound which forms the organic luminous layer is a triphenyl-amine derivative.

24. An EL element in claim 1, wherein at least two layers made from organic materials are present, wherein the layers made from organic materials include an organic luminous layer and a hole transport layer, the hole transport layer being provided between the organic luminous layer and the hole injection electrode.

25. An EL element in claim 24, wherein the organic luminous layers comprise the oxadiazole series compounds.

26. An EL element in claim 25, wherein the organic luminous layer comprises an oxadiazole series compound having a plurality of oxadiazole rings and one benzene ring between the oxadiazole rings.

27. An EL element in claim 26, wherein the number of said oxadiazole rings is 2, the benzene ring being substituted by the oxadiazole rings at one of ortho position (1,2), meta position (1,3) and para position (1,4).

28. An EL element in claim 27, wherein the benzene ring, which is substituted by the oxadiazole rings at the two positions, is substituted by the oxadiazole ring at one more position.

29. An EL element in claim 26, wherein the number of the oxadiazole rings is 3, the benzene ring being substituted by the oxadiazole rings at 1, 3 and 5 positions.

30. An EL element in claim 25, wherein the organic luminous layer comprises an oxadiazole series compound having a plurality of oxadiazole rings and two benzene rings between the oxadiazole rings.

31. An EL element in claim 30, wherein the number of the oxadiazole rings is 2, the biphenyl group which consists of the two benzene rings being substituted by the oxadiazole at either 4- and 4'- or 2- and 2'- positions.

32. An EL element in claim 25, wherein the organic luminous layer comprises an oxadiazole series compound having a plurality of oxadiazole rings and an alkyl chain between the oxadiazole rings.

33. An EL element in claim 32, wherein the number of the oxadiazole rings is 2, the carbon number of the alkyl chain is 1-6.

34. An EL element in claim 25, wherein the organic compounds which form a hole transport layer are diamine.

35. An EL element in claim 25, wherein the oxadiazole series compounds are selected from the chemical formulas shown below:

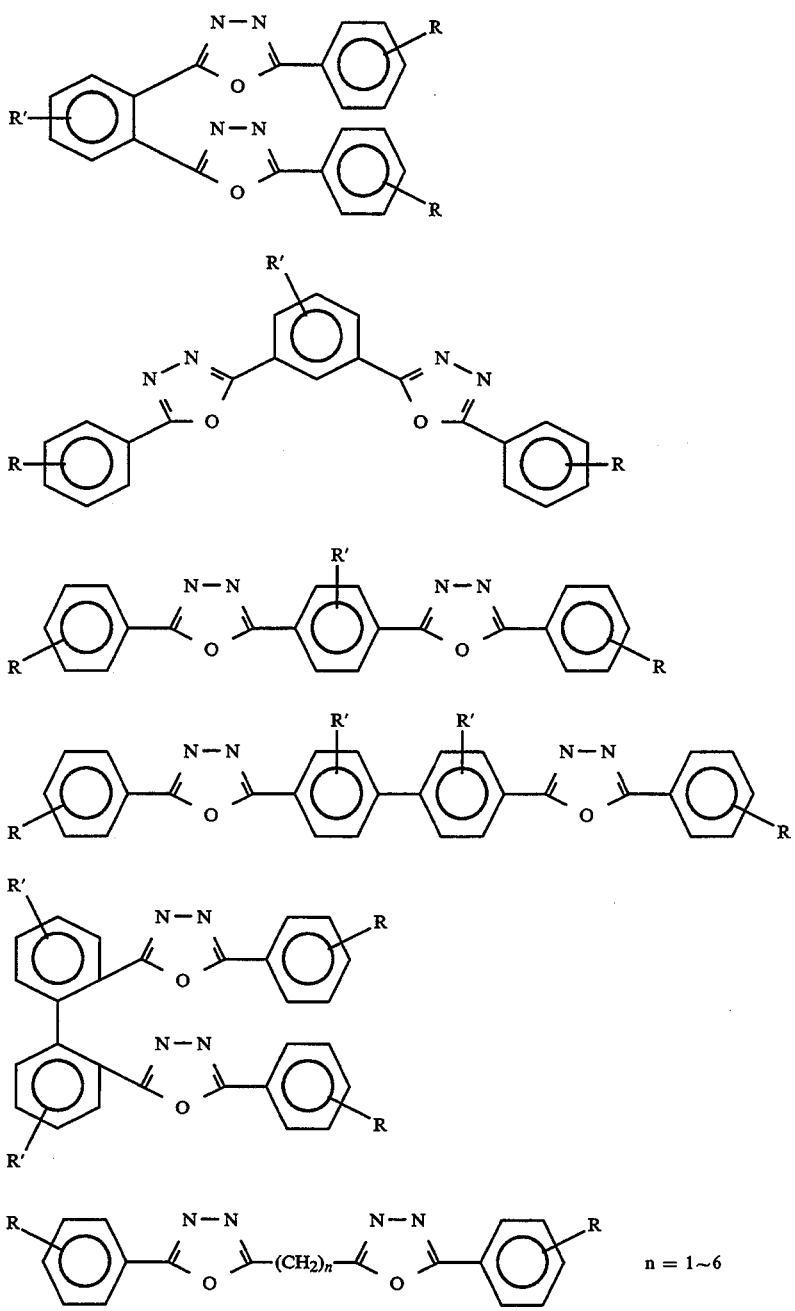

-continued
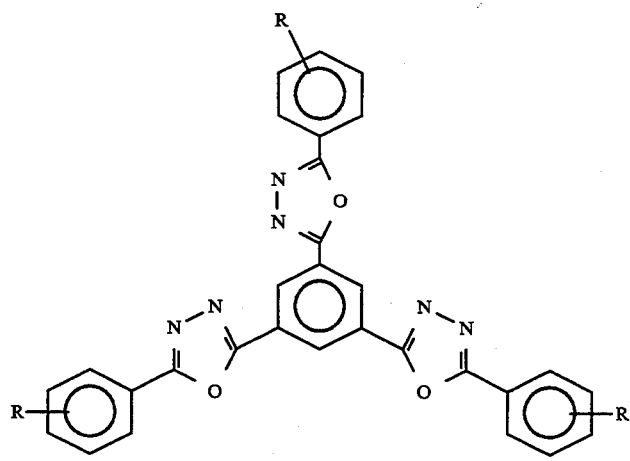
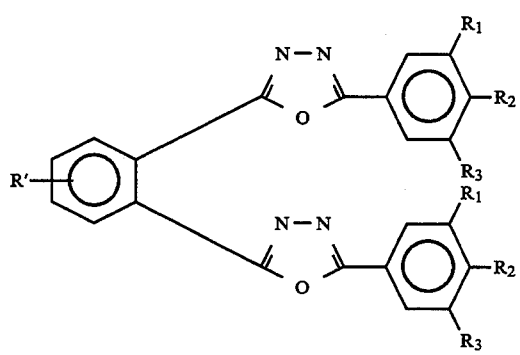
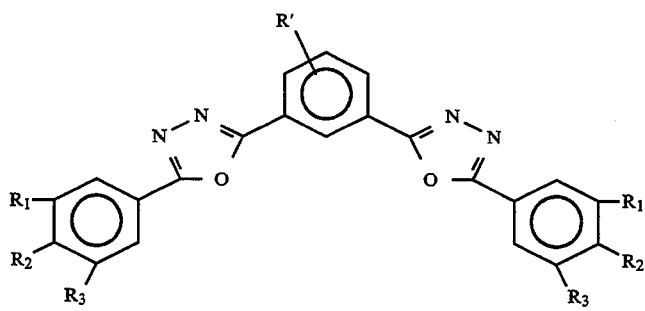
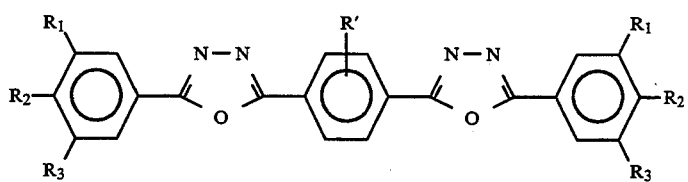
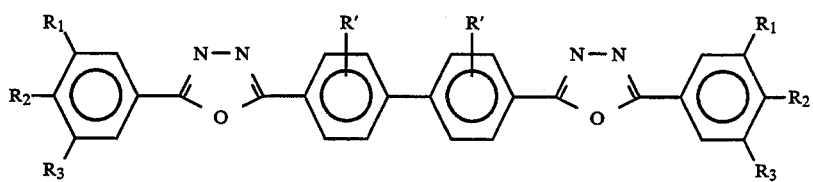

-continued

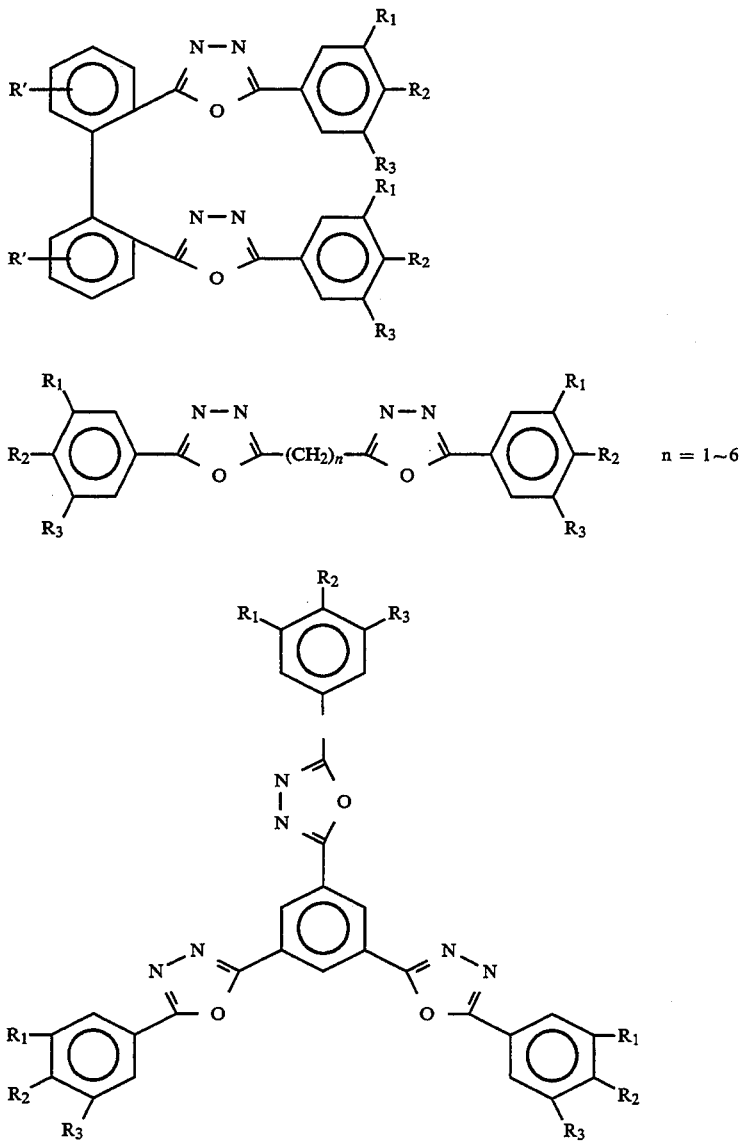

wherein R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl, and R' is selected from the group consisting of H, $CH_3$, $C_2H_5$, $OCH_3$, $OC_2H_5$, $N(CH_3)_2$ and an oxadiazole ring.

36. An EL element in claim 24, wherein a hole transport layer comprises the oxadiazole series compound.

37. An EL element in claim 36, wherein the hole transport layer comprises an oxadiazole series compound having a plurality of oxadiazole rings and one benzene ring between the oxadiazole rings.

38. An EL element in claim 37, wherein the number of said oxadiazole rings is 2, the benzene ring being substituted by the oxadiazole rings at one of ortho position (1,2), meta position (1,3) and para position (1,4).

39. An EL element in claim 38, wherein the benzene ring, which is substituted by the oxadiazole rings at the two positions, is substituted by the oxadiazole ring at one more position.

40. An EL element in claim 37, wherein the number of the oxadiazole rings is 3, the benzene ring being substituted by the oxadiazole rings at 1, 3 and 5 positions.

41. An EL element in claim 36, wherein the hole transport layer comprises an oxadiazole series compound having a plurality of oxadiazole rings and two benzene rings between the oxadiazole rings.

42. An EL element in claim 41, wherein the number of the oxadiazole rings is 2, a biphenyl group which includes the two benzene rings being substituted by the oxadiazole at either the 4- and 4'- or 2- and 2'- positions.

43. An EL element in claim 36, wherein the hole transport layer comprises an oxadiazole series compound having a plurality of oxadiazole rings and an alkyl chain between the oxadiazole rings.

44. An EL element in claim 43, wherein the number of the oxadiazole rings is 2, the carbon number of an alkyl chain between the oxadiazole rings being 0-10.

45. An EL element in claim 36, wherein the oxadiazole series compounds are selected from the group consisting of the chemical formulas shown below:

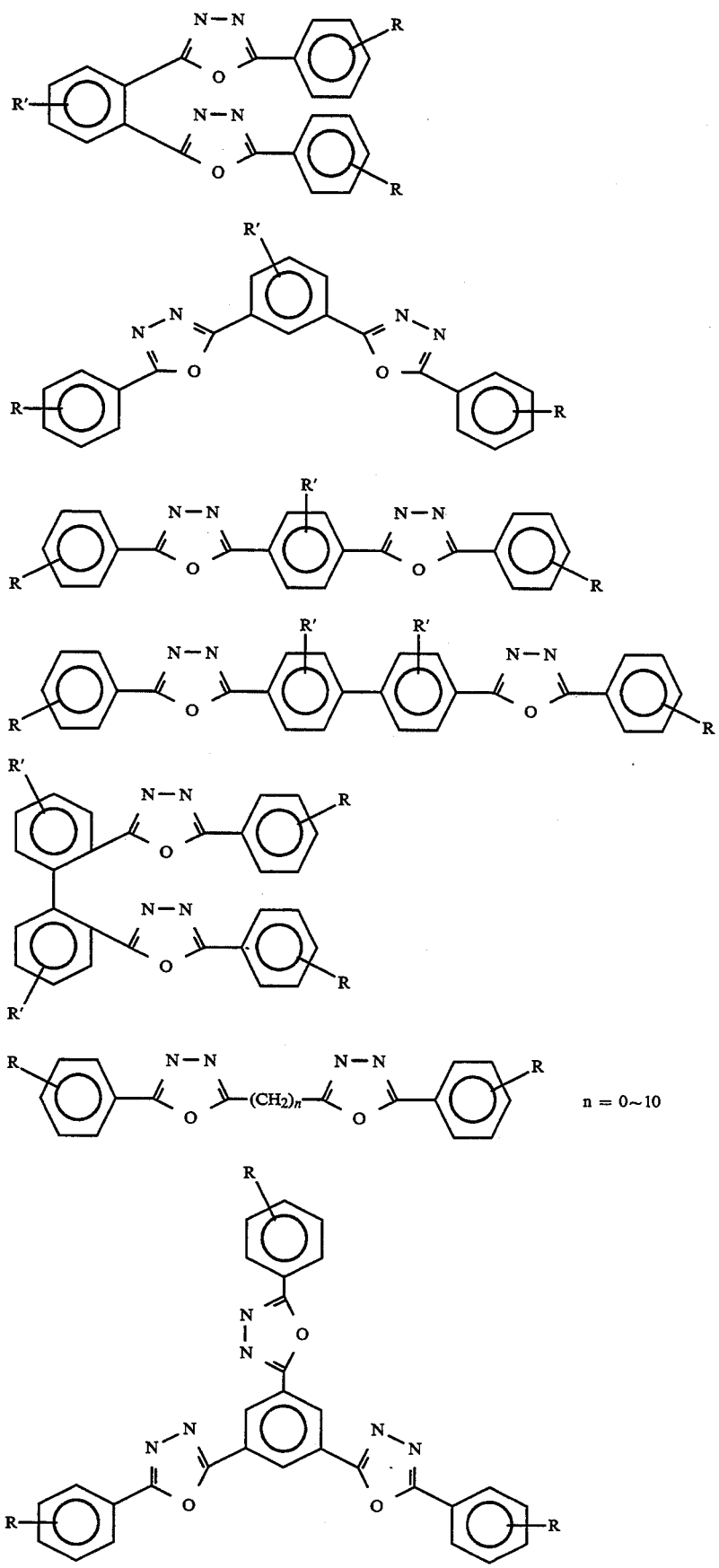

-continued
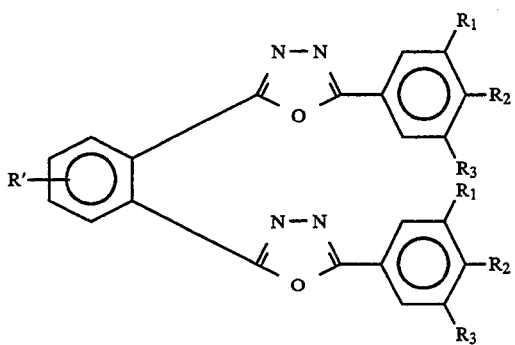
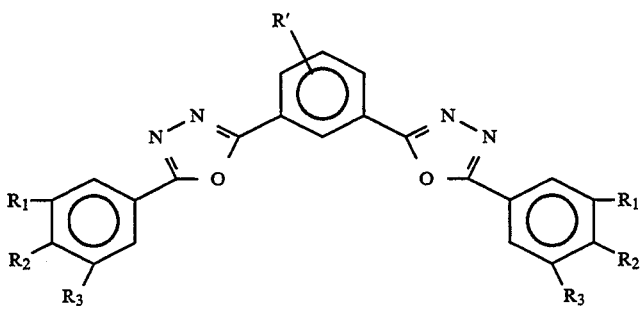
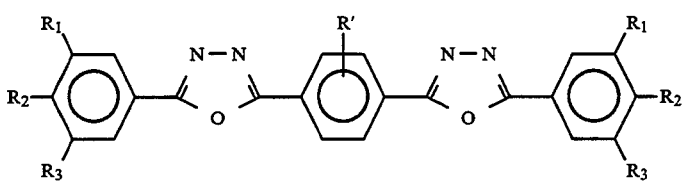
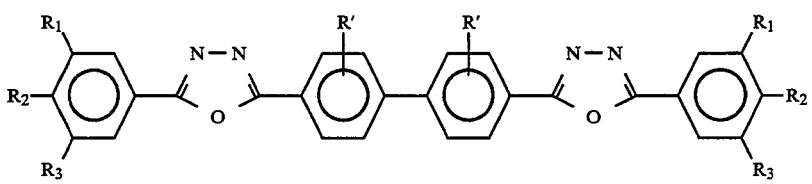
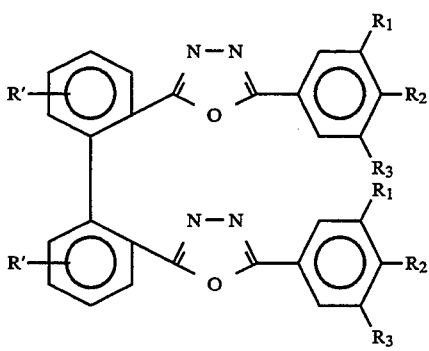
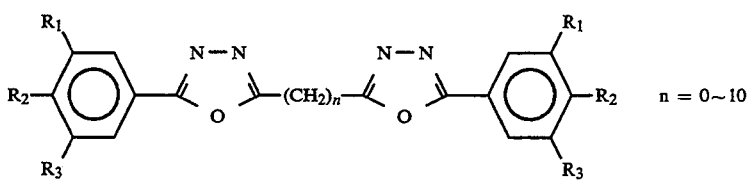  n = 0~10

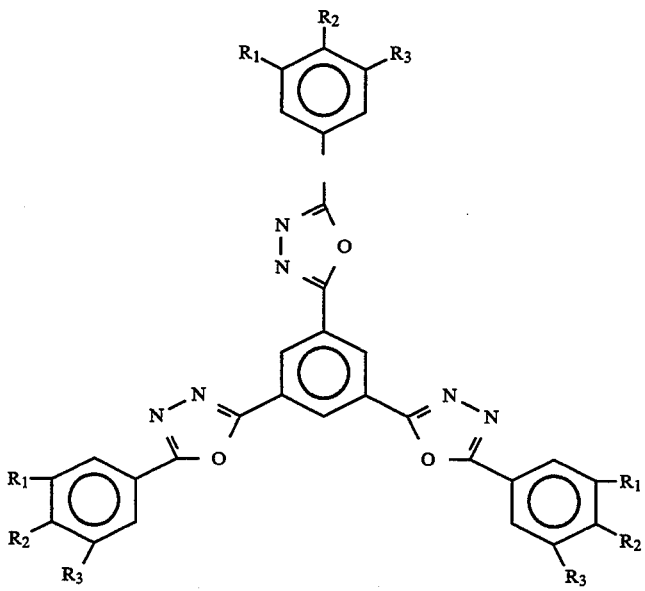

wherein R, R1, R2 and R3 are selected from the group consisting of NH$_2$, N(CH$_3$)$_2$, and N(C$_2$H$_5$)$_2$, and R' is selected from the group consisting of H, C$_n$H$_{2n+1}$(n=1-10), OCH$_3$, OC$_2$H$_5$, phenyl, cyclohexyl and an oxadiazole ring.

46. An EL element in claim 36, wherein the organic compounds which form an organic luminous layer are selected from the group consisting of 8-Hydroxyquinoline aluminum, a perylene derivative and a perinone derivative.

47. An EL element in claim 1, wherein at least three layers made from organic material are present, wherein the layers made from organic materials include an organic luminous layer, an electron transport layer and a hole transport layer, the electron transport layer being provided between the organic luminous layer and the electron injection electrode, and the hole transport layer being provided between the organic luminous layer and the hole injection electrode.

48. An EL element in claim 47, wherein the organic luminous layers comprise the oxadiazole series compounds.

49. An EL element in claim 48, wherein the organic luminous layer comprises an oxadiazole series compound having a plurality of oxadiazole rings and one benzene ring between the oxadiazole rings.

50. An EL element in claim 49, wherein the number of said oxadiazole rings is 2, the benzene ring being substituted by the oxadiazole rings at one of ortho position (1,2), meta position (1,3) and para position (1,4).

51. An EL element in claim 50, wherein the benzene ring, which is substituted by the oxadiazole rings at the two positions, is substituted by the oxadiazole ring at one more position.

52. An EL element in claim 49, wherein the number of the oxadiazole rings is 3, the benzene ring being substituted by the oxadiazole rings at 1, 3 and 5 positions.

53. An EL element in claim 48, wherein the organic luminous layer comprises an oxadiazole series compound having a plurality of oxadiazole rings and two benzene rings between the oxadiazole rings.

54. An EL element in claim 53, wherein the number of the oxadiazole rings is 2, a biphenyl group which includes the two benzene rings being substituted by the oxadiazole at either 4- and 4'- or 2- and 2'- positions.

55. An EL element in claim 48, wherein the organic luminous layer comprises an oxadiazole series compound having a plurality of oxadiazole rings and an alkyl chain between the oxadiazole rings.

56. An EL element in claim 55, wherein the number of the oxadiazole rings is 2, the carbon number of an alkyl chain between the oxadiazole rings being 1-6.

57. An EL element in claim 48, wherein the oxadiazole series compounds are selected from the group consisting of the chemical formulas shown below:

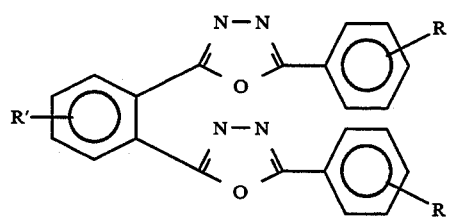

-continued
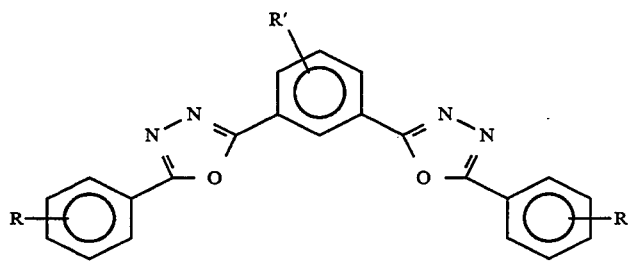
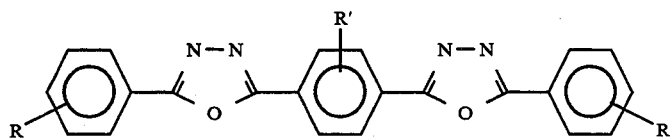
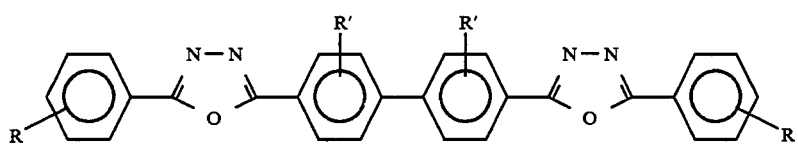
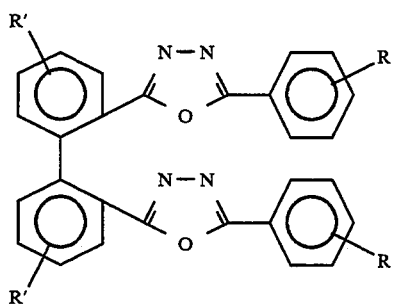
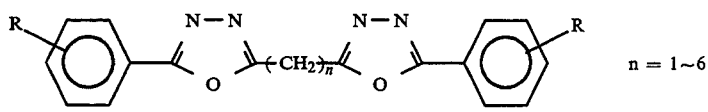     n = 1~6
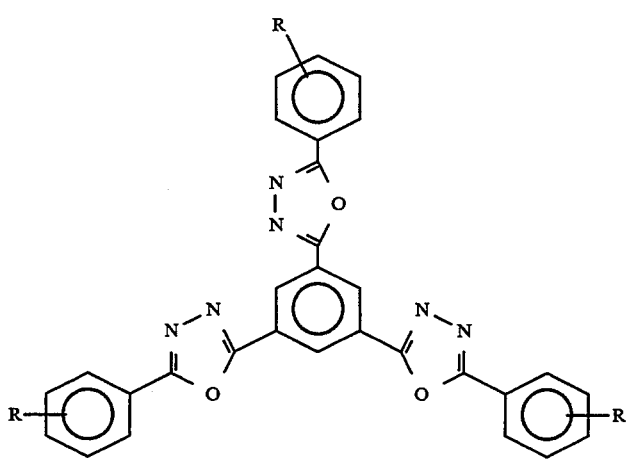

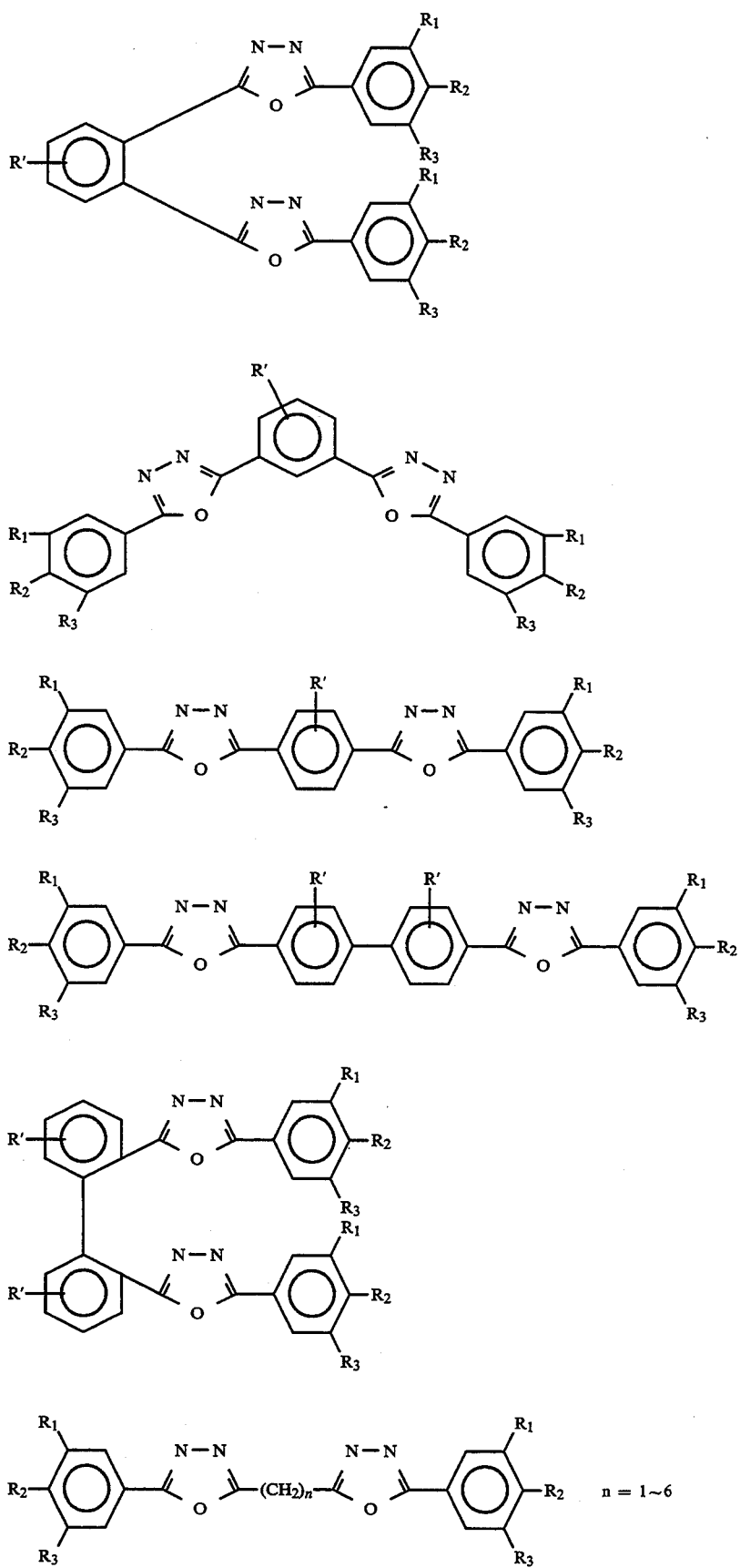

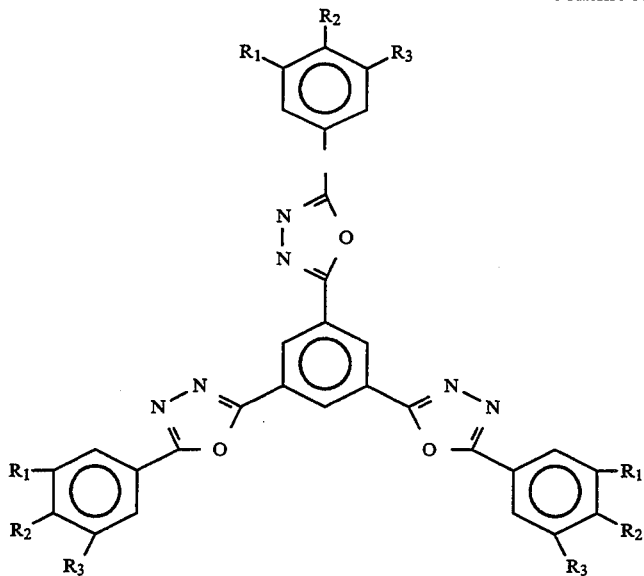

wherein R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl, and R' is selected from the group consisting of H, $CH_3$, $C_2H_5$, $OCH_3$, $OC_2H_5$, $N(CH_3)_2$ and an oxadiazole ring.

58. An EL element in claim 47, wherein the electron transport layer comprises the oxadiazole series compounds.

59. An EL element in claim 58, wherein the electron layer comprises an oxadiazole series compound having a plurality of oxadiazole rings and one benzene ring between the oxadiazole rings.

60. An EL element in claim 59, wherein the number of said oxadiazole rings is 2, the benzene ring being substituted by the oxadiazole rings at one of ortho position (1,2), meta position (1,3) and para position (1,4).

61. An EL element in claim 60, wherein the benzene ring, which is substituted by the oxadiazole rings at the two positions, is substituted by the oxadiazole ring at one more position.

62. An EL element in claim 59, wherein the number of the oxadiazole rings is 3, the benzene ring being substituted by the oxadiazole rings at 1, 3 and 5 positions.

63. An EL element in claim 58, wherein the electron transport luminous layer comprises an oxadiazole series compound having a plurality of oxadiazole rings and two benzene rings between the oxadiazole rings.

64. An EL element in claim 63, wherein the number of the oxadiazole rings is 2, a biphenyl group which includes the two benzene rings being substituted by the oxadiazole at either 4- and 4'- or 2- and 2'- positions.

65. An EL element in claim 58, wherein the electron transport layer comprises an oxadiazole series compound having a plurality of oxadiazole rings and an alkyl chain between the oxadiazole rings.

66. An EL element in claim 65, wherein the number of the oxadiazole rings is 2, the carbon number of an alkyl chain between the oxadiazole rings being 1-6.

67. An EL element in claim 58, wherein the oxadiazole series compounds are selected from the chemical formulas shown below:

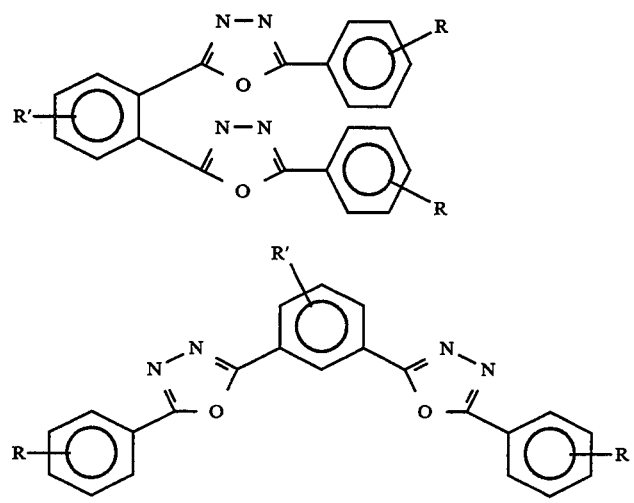

-continued
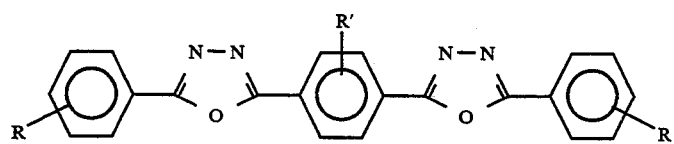
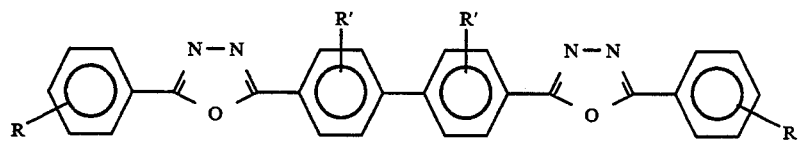
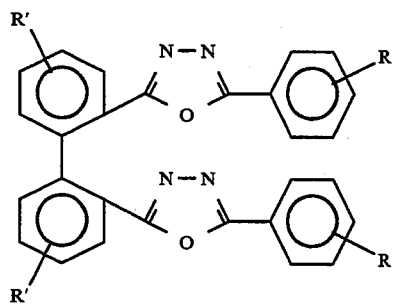
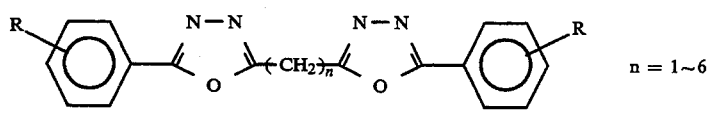 n = 1~6
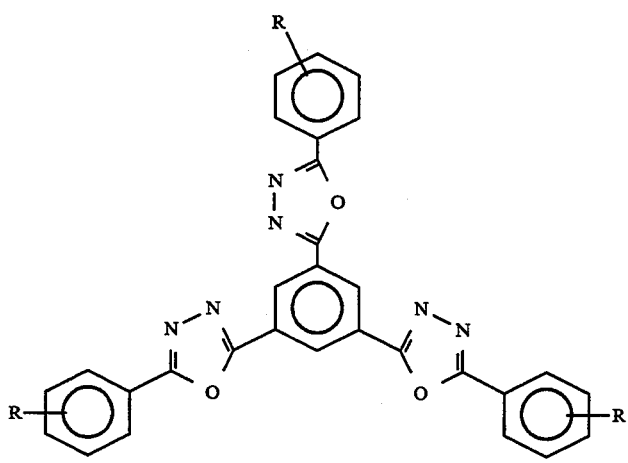
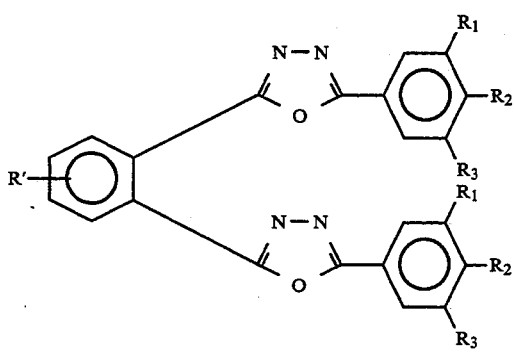

-continued
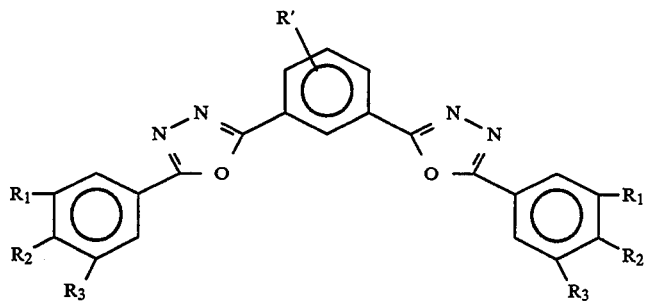
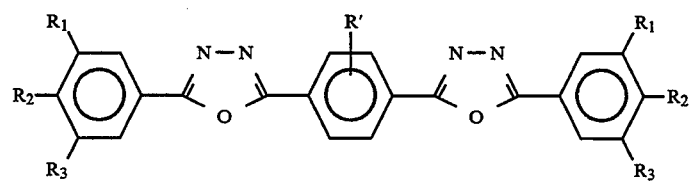
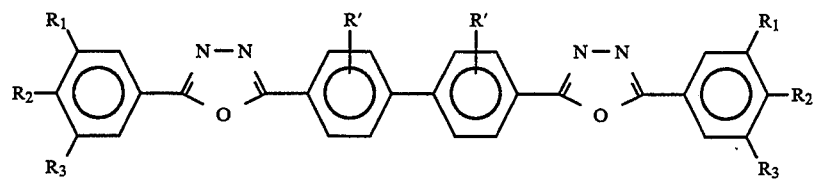
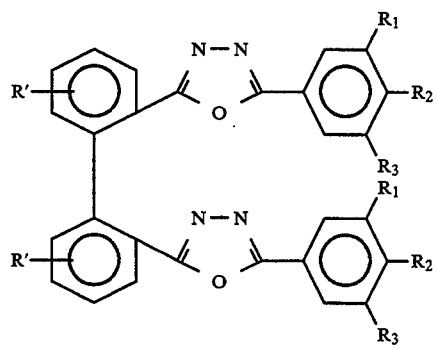
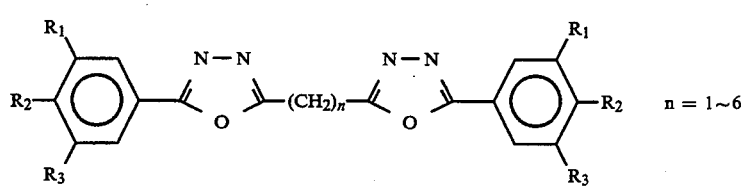  n = 1~6
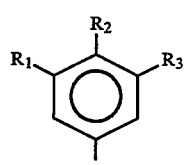

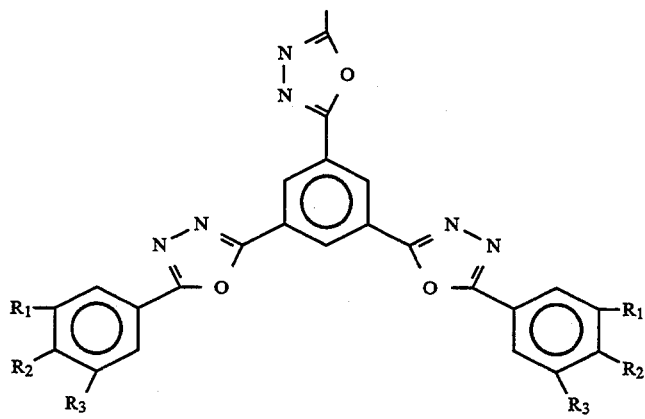

wherein R, $R_1$, $R_2$ and $R_3$ are selected from the group consisting of H, $CH_3$, $C_2H_5$, $C_3H_7$ $(CH_3)_3C$, $OCH_3$, $OC_2H_5$, $NH_2$, $N(CH_3)_2$, $N(C_2H_5)_2$, CN, phenyl and cyclohexyl, and R' is selected from the group consisting of H, $CH_3$, $C_2H_5$, $OCH_3$, $OC_2H_5$, $N(CH_3)_2$ and an oxadiazole ring.

68. An EL element in claim 58, wherein the hole transport layer is made front diamine, the organic luminous layer being made from 1,1,4,4,tetraphenyl 1, 3 butadiene.

* * * * *

UNITED STATES PATENT AND TRADEMARK OFFICE
CERTIFICATE OF CORRECTION

PATENT NO. : 5,382,477　　　　　　　　　　　　　　Page 1 of 2

DATED : January 17, 1995

INVENTOR(S) : SAITO et al.

It is certified that error appears in the above-identified patent and that said Letters Patent is hereby corrected as shown below:

On the cover sheet, in the identification of Assignee, after "Osaka, Japan", please insert --and Ricoh Co., Ltd., Tokyo, Japan-- .

In Col. 4, line 1, delete the word "the" after the numeral "2" and before "a."

In Col. 29, line 54 after the word "layer" and before the word "may" insert the word --then-- .

In Col. 29, line 55 delete the words "less exciton" after "having" and insert the phrase --a lower excitonic-- .

In Col. 29, line 57 after the word "layer" and before "the" insert the word --and-- .

In Col. 29, line 58 delete "being" after the word "layer" and before "the" and insert the words --may include-- .

In Col. 30, line 66 delete the word "on" after the word "conjunction" and before the word "with ."

In Col. 31, line 27 change the word "forth" to --fourth--.

In Col. 31, line 31 please change "characteristics" to --characteristic--.

In Col. 35, line 62 please change "$(B_1)$-$(B_9)$ elements" to --elements $(B_1)$-$(B_9)$--.

In Col. 36, line 45 after the word "has" delete the word "an".

In Col. 37, line 46 change the word "Forth" to --Fourth--.

In Col. 39, line 21 please change the word "ultrasonic" to --ultrasonically--.

In Col. 44, line 11 after the word "As" insert the word --is--.

In Col. 44, line 11 before "$(A_5)$-$(A_8)$" insert the word --the--.

In Col. 44, line 12, insert --are-- before "more".

In Col. 44, line 27 after the word "between" and before the word "oxadiazole" delete "(2)".

In Col. 44, line 28 after "28," and before the word "oxadiazole" insert --(2)--.

UNITED STATES PATENT AND TRADEMARK OFFICE
CERTIFICATE OF CORRECTION

PATENT NO. : 5,382,477

DATED : January 17, 1995

INVENTOR(S) : SAITO et al.

It is certified that error appears in the above-identified patent and that said Letters Patent is hereby corrected as shown below:

In Col. 45, line 16 beneath the second diagram described as [chemical formula 32] insert the subtitle —(The Ninth Example)—.

In Col. 50, lines 4, 7, 27 and 30 change the word "currency" to —current—.

Signed and Sealed this

Twenty-eighth Day of November 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   :   5,382,477

DATED        :   January 17, 1995

INVENTOR(S)  :   Saito et al.

It is certified that error appears in the above-identified patent and that said Letters Patent is hereby corrected as shown below:

On the title page, item [73], Assignee after "Osaka, Japan", please insert --and Ricoh Co., Ltd., Tokyo, Japan--.

Signed and Sealed this

Second Day of April, 1996

*Attest:*

BRUCE LEHMAN

*Attesting Officer*   Commissioner of Patents and Trademarks